United States Patent
Suzuki et al.

(10) Patent No.: US 8,197,916 B2
(45) Date of Patent: Jun. 12, 2012

(54) CELLULOSE ESTER FILM, LIGHT DIFFUSING FILM, POLARIZING PLATE, AND LIQUID CRYSTAL DISPLAY

(75) Inventors: Shinichiro Suzuki, Koganei (JP); Masataka Takimoto, Machida (JP)

(73) Assignee: Konica Minolta Opto, Inc., Tokyo (JP)

( * ) Notice: Subject to any disclaimer, the term of this patent is extended or adjusted under 35 U.S.C. 154(b) by 989 days.

(21) Appl. No.: 12/223,155

(22) PCT Filed: Jan. 19, 2007

(86) PCT No.: PCT/JP2007/050785
§ 371 (c)(1),
(2), (4) Date: Jul. 23, 2008

(87) PCT Pub. No.: WO2007/088736
PCT Pub. Date: Aug. 9, 2007

(65) Prior Publication Data
US 2010/0233389 A1    Sep. 16, 2010

(30) Foreign Application Priority Data
Jan. 31, 2006    (JP) .................................. 2006-022245

(51) Int. Cl.
C09K 19/00 (2006.01)
B29D 11/00 (2006.01)
B29C 39/14 (2006.01)

(52) U.S. Cl. ........ 428/1.33; 428/1.1; 264/1.34; 264/2.6; 264/2.7

(58) Field of Classification Search ................. 428/1.33, 428/1.1; 264/1.34, 2.6, 2.7
See application file for complete search history.

(56) References Cited

U.S. PATENT DOCUMENTS

| | | | | |
|---|---|---|---|---|
| 2007/0048462 | A1* | 3/2007 | Takebe et al. | 428/1.33 |
| 2007/0092663 | A1* | 4/2007 | Murakami | 428/1.31 |

FOREIGN PATENT DOCUMENTS

| | | | |
|---|---|---|---|
| JP | 07-013002 | A | 1/1995 |
| JP | 09-159837 | A | 6/1997 |
| JP | 10-142406 | A | 5/1998 |
| JP | 11-006905 | A | 1/1999 |
| JP | 11-064611 | A | 3/1999 |
| JP | 11-271510 | A | 10/1999 |
| JP | 2000-239541 | A | 9/2000 |
| JP | 2001-172403 | A | 6/2001 |
| JP | 2002-196146 | A | 7/2002 |
| JP | 2003-012859 | A | 1/2003 |
| JP | 2006-143873 | A | 6/2006 |
| JP | 2006-291192 | A | 10/2006 |

* cited by examiner

Primary Examiner — James J Seidleck
Assistant Examiner — Deve E Valdez
(74) Attorney, Agent, or Firm — Holtz, Holtz, Goodman & Chick, PC

(57) ABSTRACT

Disclosed is a cellulose ester film which, when used in a polarizing plate, can impart excellent dimensional stability, curling properties and surface properties to the polarizing plate. Also disclosed is a light-scattering-film, a polarizing plate or a liquid crystal display element which is produced by using the cellulose ester film, and therefore has more excellent optical anisotropy, higher surface properties and a smoother surface, causes less curling, and has good surface quality. The cellulose ester film comprises 1 to 50% by mass (inclusive) of microparticles having an average particle diameter of 1 to 400 nm (inclusive) and a compound showing negative birefringence in the direction of drawing, and has a retardation value ($R_o$) defined by the equation (I) of 0 to 5 nm (inclusive) and a retardation value ($R_t$) defined by the equation (II) of $-10$ to 20 nm (inclusive), both measured at 23° C. and 55% RH: Equation (I): $R_o = (nx - ny) \times d$; and Equation (II): $R_t = [(nx + ny)/2 \times nz] \times d$.

10 Claims, 1 Drawing Sheet

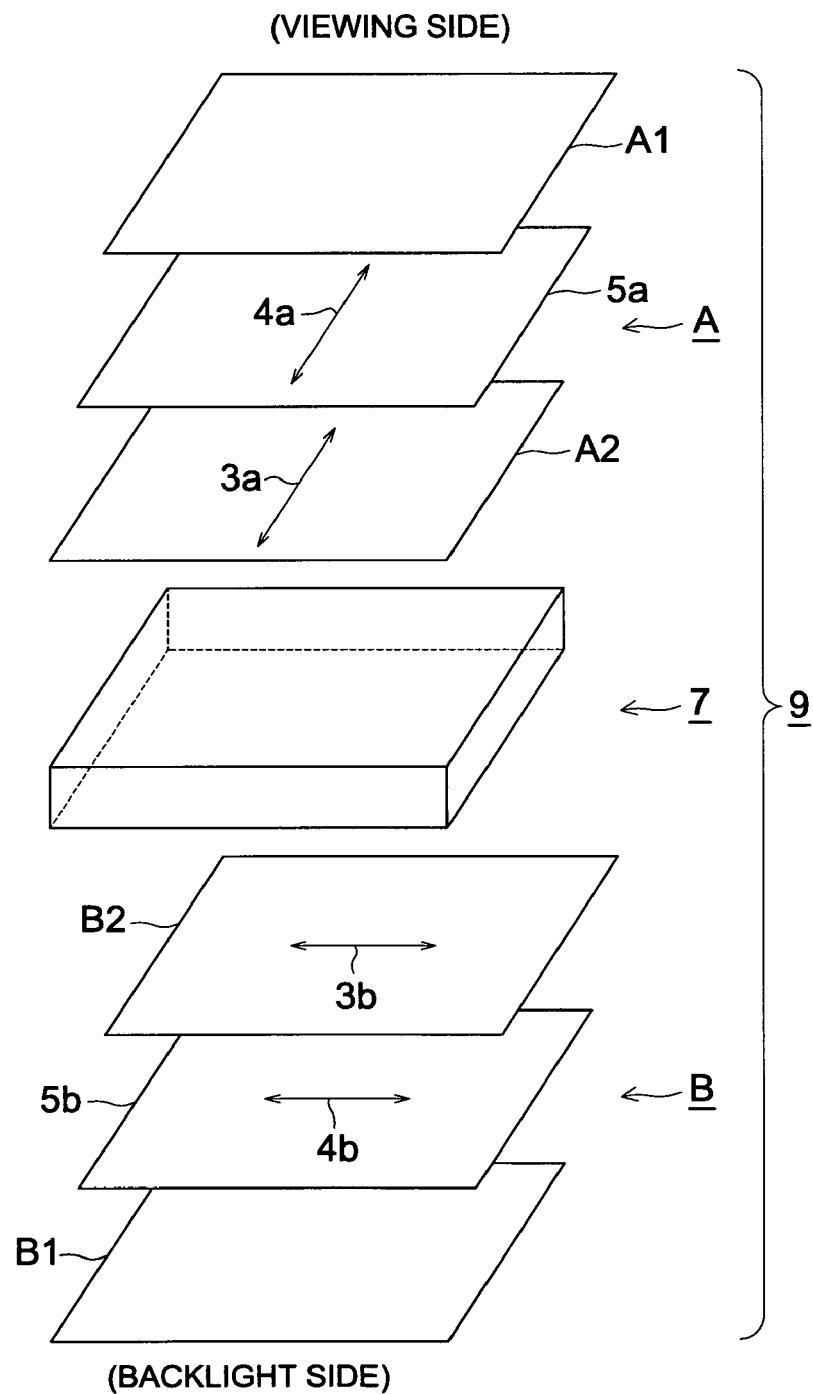

CELLULOSE ESTER FILM, LIGHT DIFFUSING FILM, POLARIZING PLATE, AND LIQUID CRYSTAL DISPLAY

This application is the United States national phase application of International Application PCT/JP2007/050785 filed Jan. 19, 2007.

TECHNICAL FIELD

The present invention relates to a cellulose ester film, a light diffusing film, a polarizing plate, and a liquid crystal display.

BACKGROUND ART

With the high performance and high definition of a liquid crystal display, as a polarizing plate protective film used for a polarizing plate, the polarizing plate protective film is required to have a performance durable to a severe environmental variation in terms of the dimensional stability of a polarizing plate, the curl characteristics of a polarizing plate, and the surface nature of a polarizing plate.

As a polarizing plate protective film of the liquid crystal display used generally at present, a film whose material is cellulose is used. As for a cellulose ester film, generally, a solution casting film forming method is taken from viewpoints of securement of flatness. Therefore, in the solution casting process, since a film expands to a thickness direction with evaporation of a solvent, the refractive index of the thickness direction becomes lower than that in a film plane. As a result of consideration for a display mode of a liquid display device, other retardation film and retardation of members, a polarizer protective film suitable for securing a view angle of a liquid crystal device is required to be a film in which the refractive index in the thickness direction is equal to that in the in-plane direction, or to be a polarizing plate protective film in which the in-plane refractive index is higher.

In Patent document 1, it is disclosed that by the addition of ethylenic polymer, the deterioration of a polarizer under high temperature and high humidity becomes small and a film in which retardation in the thickness direction is small can be obtained. However, it turned out that only with the addition of ethylenic polymer, it is difficult to obtain a currently-required film in which retardation in the thickness direction is small and a polarizing plate excellent in the curl characteristics of a polarizing plate and the surface nature of a polarizing plate. Further, it turned out that the more the ethylenic polymer is added in order to reduce retardation, the more the above-mentioned characteristics deteriorate.

On the other hand, in a liquid crystal display, in order to make it easy to observe a displayed image, an illumination panel is arranged behind a liquid crystal display panel, and light from the illumination panel is transmitted from the rear side to the front side of the liquid crystal display panel so as to display an image.

The backlight used here is required to irradiate the whole liquid crystal display screen uniformly. Recently, in a thin type liquid crystal display of a note book type personal computer required to be miniature and thin more, a sidelight type plane light source to make light to enter a liquid crystal displace screen from its side is used preferably. Generally, in this sidelight type plane light source, adopted is a light guiding plate system to use a light guiding plate capable of transmitting and dispersing light uniformly and to irradiate the whole liquid crystal display screen uniformly. This light guiding plate system comprises a light guiding plate, a light source arranged at a side where light of both sides of the light guiding plate enters, a reflecting plate arranged at the back side of the light guiding plate, a light diffusing film to scatter and disperse light coming out from a light emitting surface being a front surface of the light guiding plate and to make the luminance of an irradiation surface uniform.

A milky white resin film described in Patent document 2 is used for a light diffusing film applied to such an illumination panel. It makes light emitted from a light guiding plate to diffuse light, makes light from a light source uniform, and spreads light, whereby it contributes to improve the view angle of a display device.

However, the light diffusing film is required to be excellent more in optical isotropy, high flatness, smooth surface, little curl, and good plane quality. Further, a producing method for a light diffusing film with high productivity is requested.

Moreover, although various light diffusing films are proposed by, for example, Patent documents 3 to Patent document 8, these proposed light diffusing films have a complicated structure and is not sufficient as a light diffusing film having good optical characteristics and plane quality.

Patent document 1: Japanese Patent Unexamined Publication No. 2003-12859, Official gazette Patent document 2: Japanese Patent Unexamined Publication No. 2001-172403, Official gazette Patent document 3: Japanese Patent Unexamined Publication No. 11-6905, Official gazette Patent document 4: Japanese Patent Unexamined Publication No. 11-64611, Official gazette Patent document 5: Japanese Patent Unexamined Publication No. 10-142406, Official gazette Patent document 6: Japanese Patent Unexamined Publication No. 9-159837, Official gazette Patent document 7: Japanese Patent Unexamined Publication No. 7-13002, Official gazette Patent document 8: Japanese Patent Unexamined Publication No. 11-271510, Official gazette

DISCLOSURE OF THE INVENTION

Problems to be Solved by the Invention

The present invention was conceived in view of the above-mentioned problems, and an object of the invention is to provide a cellulose ester film excellent in the dimensional stability of a polarizing plate, the curl characteristics of a polarizing plate, and the surface nature of a polarizing plate, further, to provide a light diffusing film excellent more in optical isotropy, high flatness, smooth surface, little curl, and good plane quality by use of the cellulose ester film, a polarizing plate and a liquid crystal display device.

Means to Solve the Problems

The above object of the present invention can be attained by the following structures.

1. A cellulose ester film characterized in that the cellulose ester film contains fine particles having an average particle size of 1 nm or more and 400 nm or less in an amount of 1% by weight or more and 50% by weight or less and a composition having a negative birefringence to the stretching direction, and a retardation values Ro defined by the following formula (I) and measured under the condition of 23° C. and 55% RH is within a range of 0 nm or more and 5 nm or less, and a retardation value Rt defined by the following formula (II) is within a range of −10 nm or more and 20 nm or less.

$$Ro = (nx - ny) \times d \quad \text{Equation (i)}$$

$$Rt = ((nx + ny)/2 - nz) \times d \quad \text{Equation (ii)}$$

in Equations, nx represents a refractive index in a film in-plane slow axis direction, ny represents a refractive index in a film in-plane fast axis direction, nz represents a refractive index in a film thickness direction, and d represents a film thickness (nm).

2. The cellulose ester film described in the above mentioned 1 and characterized in that the fine particles are metal oxide fine particles.
3. The cellulose ester film described in the above mentioned 1 or 2 and characterized in that the composition showing negative birefringence to the stretching direction is an acrylic polymer having a weight average molecular weight of 500 or more and 30,000 or less or a polyester having a weight average molecular weight of 500 or more and 10,000 or less and not having an aromatic ring.
4. The cellulose ester film described in the above mentioned 3 and characterized in that the acrylic polymer is polymer X represented with following Formula (1) or polymer Y represented with following Formula (2).

$$-(Xa)_m-(Xb)_n-(Xc)_p- \quad \text{Formula (1)}$$

(in Formula (1), Xa is an ethylenic unsaturated monomer not having an aromatic ring and a hydroxyl group in its molecule, Xb is an ethylenic unsaturated monomer not having an aromatic ring and having a hydroxyl group in its molecule, and Xc is a copolymerizable ethylenic unsaturated monomer except Xa and Xb, and m, n, and p represent a mole composition ratio, provided that m is not 0, n is not 0, k is not 0, and m+n+p=100.)

$$-[Ya]_k-[Yb]_q- \quad \text{Formula (2)}$$

(in Formula (2), Ya is an ethylenic unsaturated monomer not having an aromatic ring in its molecule and Yb is an ethylenic unsaturated monomer copolymerizable with Ya, and k and q represent a mole composition ratio, provided that k is not 0, q is not 0 and k+q=100.)

5. The cellulose ester film described in the above mentioned 3 and characterized in that the polyester is represented by the following Formula (3) or (4).

$$B_1-(G-A-)_m G-B_1 \quad \text{Formula (3)}$$

(in Formula (3), $B_1$ represents a mono-carboxylic acid having a carbon number of 1 to 12, G represents a divalent alcohol having a carbon number of 2 to 12, and A represents a dibasic acid having a carbon number of 2 to 12, and none of $B_1$, G and A contains an aromatic ring, and m is a repeating number.)

$$B_2-(A-G-)_n A-B_2 \quad \text{Formula (4)}$$

(in Formula (4), $B_2$ represents a mono-alcohol having a carbon number of 1 to 12; G represents a divalent alcohol having a carbon number of 2 to 12; and A represents a dibasic acid having a carbon number of 2 to 12, and none of $B_2$, G and A contains an aromatic ring and n is a repeating number.)

6. A light diffusing film characterized by employing the cellulose ester film described in any one of the above mentioned 1 to 5.
7. A polarizing plate characterized by pasting the cellulose ester film described in any one of the above mentioned 1 to 5 on at least one surface thereof.
8. A liquid crystal display device characterized by employing the light diffusing film described in the above mentioned 6.
9. A liquid crystal display device characterized by employing the polarizing plate described in the above mentioned 7 on at least one surface of a liquid crystal cell.
10. The liquid crystal display device described in the above mentioned 9 and characterized in that the liquid crystal cell is a liquid crystal cell for an IPS mode type liquid crystal display device.

Effect of the Invention

According to the present invention, it becomes possible to provide a cellulose ester film excellent in the dimensional stability of a polarizing plate, the curl characteristics of a polarizing plate, and the surface nature of a polarizing plate, further to provide a light diffusing film excellent more in optical isotropy, high flatness, smooth surface, little curl, and good plane quality by use of the cellulose ester film, a polarizing plate and a liquid crystal display device.

BRIEF DESCRIPTION OF THE DRAWING

FIG. 1 is a schematic view showing an example of a structure of a liquid crystal device.

EXPLANATION OF REFERENCE SIGNS

A1 Polarizing plate protective film
A2 Cellulose ester film Y or optical compensation film W
B1 Polarizing plate protective film
B2 Cellulose ester film Y or optical compensation film W
5a, 5b Polarizer
3a, 3b Slow axis direction of optical film
4a, 4s Transmission axis of polarizer
A, B Polarizing plate
7 Liquid crystal cell
9 Liquid crystal display device

BEST MODE FOR CARRYING OUT THE INVENTION

Hereinafter, the best mode for carrying out the present invention will be explained in detail, however, the present invention is not limited to these.

As a result of studying keenly in view of the above mentioned problems, the present invention found out that when a cellulose ester film is characterized in that the cellulose ester film contains fine particles having an average particle size of 1 nm or more and 400 nm or less in an amount of from 1% by weight to 50% by weight and a composition having a negative birefringence to the stretching direction, and a retardation values Ro defined by the following formula (1) and measured under the condition of 23° C. and 55% RH is 0 nm or more and 5 nm or less, and a retardation value Rt defined by the following formula (II) is within a range of −10 nm or more and 20 nm or less, it becomes possible to provide a cellulose ester film excellent in the dimensional stability of a polarizing plate, the curl characteristics of a polarizing plate, and the surface nature of a polarizing plate.

In the present invention, as a result of repeating keen study in order to obtain a light diffusing film having a good optical characteristics and a plane quality, it became possible to obtain a light diffusing film having little curl, good plane quality and excellent optical characteristics by making the film to contain the above fine particles and resin having a negative birefringence to the stretching-direction.

Hitherto, when a lot of fine particles are added in order to acquire a light diffusion effect, there are problems that plane quality deteriorates, and an adhesive property is spoiled. However, with the structure of the present invention, the plane quality can be made good and the lowering of the adhesive property is not recognized. Furthermore, it became possible to obtain a light diffusing film having a low retardation in the thickness direction of the film and being optically uniform.

The present inventors presume that when a cellulose ester film contains fine particles having an average particle size of 1 nm or more and 400 nm or less in an amount of from 1% by weight to 50% by weight and a composition having a negative birefringence to the stretching direction such that the retardation values of the film become within the range of the present invention, stress accompanying film shrinkage by heat can be eased, thereby obtaining the effect of the present invention.

Further, the present inventors found out that the composition having a negative birefringence to the stretching direction is preferably acrylic polymer having a weight average molecular weight of 500 or more and 30000 or less, or a polyester having a weight average molecular weight of 500 or more and 10000 or less and not having an aromatic ring.

Hereafter, the present invention will be explained in detail.
(Fine Particles)

As fine particles used for the cellulose ester film of the present invention, the following inorganic substance and/or organic substance may be used solely or suitably combined with others.

As inorganic particles, for example, particles made of silicon dioxide, titanium dioxide, aluminium oxide, zirconium oxide, calcium carbonate, manganese carbonate, a talc, clay, smectite, fired kaolin, fired calcium silicate, hydrated calcium silicate, aluminium silicate, magnesium silicate, calcium phosphate, etc. may be listed. Further, as organic particles, particles made of acrylate resin, organic silicon resin, polystyrene, urea resin, formaldehyde condensate, methyl polymethacrylate acrylate resin, acrylic styrene resin, polymethyl methacrylate resin, silicon system resin, polystyrene system resin, polycarbonate resin, benzoguanamine system resin, melamine system resin, polyolefin system resin, polyester system resin, polyamide system resin, polyimide system resin, or polyfluoroethylene system resin, etc may be listed. Although fine particles are not limited to these, it is desirable in the present invention that fine particles are metal oxide particles, and especially silicon dioxide and zirconium oxide are desirable.

Examples of the silicon dioxide particles include, for example, commercial products with trade names, such as Aerosil R972, R972V, R974, R812, 200, 200V, RX300, R202, OX50, or TT600 (each manufactured by Aerosil Co., Ltd.).

As zirconium oxide, commercial products with trade names, such as Aerosil R976 or R811 (product made from Japanese Aerosil), can also be used.

The employed average particle diameter of these fine particles may be in a range of 1 to 400 nm. The average particle diameter of fine particles in the present invention is defined as the average value of particle diameter obtained by the below-mentioned average particle diameter measuring method of fine particles. That is, fine particles to be measured may be fine particles of primary particle diameter or fine particles of secondary particle diameter in which fine particles are dispersed and agglutinated, or a mixture of fine particles of primary particle diameter and fine particles of secondary particle diameter.

The average particle diameter is preferably in a range of 5 to 200 nm, more preferably in a range of 10 to 100 nm. When it is less than 1 nm, it may be difficult to disperse fine particles, and when it exceeds 400 nm, the surface nature of a film worsen.

An average particle size of fine particles can be measured, for example by use of ZETASIZER 1000HSA manufactured by MALVERN INSTRMENTS Company. Namely, ethanol (or, dispersion solvent) is used as a solvent, and a particle solution is diluted with the solvent such that particles become 0.05% by solid content. After the adjusted particle solution is homogenized by being applied with ultrasonic wave for one minute by us of an ultrasonic cleaning device, the average particle size can be measured under the condition of 23° C. and 55% RH by use of the above device.

Moreover, with regard to the average particle size of fine particles existing in a film, it can be measured from particles in a cross sectional image of a film cutting plane. Concretely, a film containing fine particles is embedded in a resin for embedding, and a 100-nm-thick ultrathin cut-out piece is made from the resin by use of ultramicrotome (MT-7 manufactured by RMC). This ultrathin cut-out piece is observed with the magnification of 10000 times by use of TEM (transmission type electron microscope: JEM-2000FX manufactured by Japanese Electronic Company, accelerating voltage: 200 kV), and its cross section image is photographed with a scanner. By use of an image analyzing software (WinROOF, ver3.60 manufactured Mitani Corp.), images of particles existing in a view field range of 2×2 μm are extracted from the photographed cross section image, the diameter of a particle image corresponding to a circle is calculated for each of the extracted images of particles, and an average diameter of 1000 particles corresponding to a circle is calculated, whereby an average particle of fine particles can be obtained.

Further, the primary particle diameter of fine particles is obtained from the specific surface area obtained by the BET method (specific surface area measuring method) with the assumption to make particle shape spherical, and, concretely, it can be calculated by use of an automatic specific surface area measuring instrument (Gemini 2360 manufactured by Shimazu-Micromeritics Corporation).

The additive amount of these fine particles is in a range of 1 to 50% by weight in a cellulose ester film, preferably in a range of 2 to 40% by weight, and more preferably in a range of 2 to 30% by weight. When it is less than 1% by weight, the effect of the present invention may not be obtained, and when it exceeds 50% by weight, a film becomes brittle. Therefore, when it is in a range of 1 to 50% by weight, the dimensional stability of a polarizing plate, the curl characteristics of a polarizing plate, the surface nature of a polarizing plate, and a light diffusibility as the purpose of the present invention can be improved.

Moreover, the additive amount may be changed in accordance with the purpose of using a cellulose ester film. In the case of a polarizing plate protective film, it is preferably in a range of 1 to 10 mass % from the viewpoint of transparency, and in the case of a light diffusing film, it is preferably in a range of 5 to 30 mass %. When the additive amount increases, the mechanical property of a film deteriorates, and when the additive amount is small, it may be difficult to acquire sufficient light diffusibility.

In the case of a light diffusing film, the refractive index difference between the added fine particles and resin is preferably 0.2 or more, because the light diffusibility can be made large with a small additive amount of fine particle, more preferably, the refractive index difference is 0.3 or more and 1.3 or less.

The following three kinds of methods, for example, may be employed as a method of preparing a dispersion solution of fine particles according to the present invention. However, the method is not limited specifically to these.

(Preparing Method A)

After carrying out stirring mixing a solvent and fine particles, the mixture is dispersed by a dispersing device. The resultant dispersion solution is made as a fine particle dispersion liquid. The fine particle dispersion liquid is added in a dope solution and is stirred.

(Preparing Method B)

After carrying out stirring mixing a solvent and fine particles, the mixture is dispersed by a dispersing device. The resultant dispersion solution is made as a fine particle dispersion liquid. Separately, a small amount of resin is added in a solvent and dissolved by stirring. The resultant solution is added with the fine particle dispersion liquid and is stirred. The resultant liquid is made as a fine particle additive liquid. The fine particle additive liquid is added in a dope solution and is stirred with a line mixer.

(Preparing Method C)

A small amount of resin is added in a solvent and dissolved by stirring. The resultant solution is added with fine particle and is dispersed by a dispersing device. The resultant liquid is made as a fine particle additive liquid. The fine particle additive liquid is added in a dope solution and is stirred with a line mixer.

Preparing method A is excellent in dispersion ability for the silicon dioxide fine particles, and Preparing method C is excellent in that fine particles hardly recoagulates. Preparing method B described above is excellent in both the point of the dispersion ability for fine particles and the point that fine particles hardly recoagulates, therefore, is more preferable among them.

(Dispersing Method)

When mixing fine particles with a solvent etc., the concentration of the fine particles is desirably 5% by mass to 30% by mass, more desirably 10% by mass to 25% by mass, most desirably 15% by mass to 20% by mass.

As a usable solvent, ketones, such as acetone and methyl ethyl ketone; organic halogenated compounds, such as methylene chloride; esters, such as methyl acetate and ethyl acetate; or alcohols may be employed. Especially, a lower alcohol is desirable. As the lower alcohol, methyl alcohol, ethyl alcohol, propyl alcohol, isopropyl alcohol, butyl alcohol, etc. are listed. However, the solvent is not limited to these. Moreover, a mixture of the above-mentioned solvents can also be used, for example, a mixture of methylene chloride and ethanol, etc. can be used.

As a dispersing device, a usual dispersing device can be used. The dispersing device is roughly divided into a media dispersing device and a medialess dispersing device.

As the media dispersing device, a ball mill, a sandmill, a dieno mill, etc. are may be listed.

A supersonic wave type, a centrifugal type, a high-pressure type, etc. may be employed as the medialess dispersing device. A high-pressure dispersing device is an apparatus to create a special condition such as a high shearing and a high-pressure state by making a composition mixed of fine particles and a solvent to pass at a high speed through a small tube. When processing with the high-pressure dispersing device, it is desirable that the maximum pressure condition in a small tube having a pipe diameter of 1 to 2000 μm in the apparatus is 10 MPa or more, more preferably 20 MPa or more. At this time, an apparatus in which the highest arrival velocity reaches 100 m/sec. or more, or an apparatus in which a rate of heat transfer reaches more than 418 kJ/hour is desirable.

Example of the high pressure dispersing device includes an ultra high speed homogenizer (commercial name: Microfluidizer) manufactured by Microfluidics Corporation and Nanomizer manufactured by Nanomizer Nanomizer Co., Ltd. Other than the above, Manton-Goulin type high pressure dispersing apparatus such as a homogenizer manufactured by Izumi Food Machinery Co., Ltd is applicable.

The cellulose ester film of the present invention is characterized to contain a compound which has negative birefringence to the stretching direction.

In order to give light diffusibility like the light diffusing film of the present invention, when fine particles were added so much, there is a problem that a film becomes brittle. However, this problem can be solved by adding polymer resin having negative birefringence as the compound which has the above-mentioned negative birefringence.

About whether polymer resin shows negative birefringence to the stretching direction, it can be judged by the following examining method.

(Test Method of the Birefringence for Polymer Resin)

After polymer resin is dissolved in a solvent, the resultant solution is cast to form a film. The film is dried by heating. The birefringence of the film having a transmittance of 80% or more is evaluated.

A refractive index measurement is conducted by an Abbe refractive index meter 4T (Product manufactured by Atago Corporation) with a multi wavelength light source. When the above film is stretched into the widthwise direction, the refractive index of the stretching direction was set to nx, and the refractive index of the in-plane direction perpendicular to the stretching direction was set to ny. It is judged that a film satisfying the formula of $((nx-ny)<0)$ about each refractive index for 550 nm has a negative birefringence.

The polymer resin showing negative birefringence to the stretching direction and usable for the present invention may be, for example, a polymer obtained by polymerizing ethylenic unsaturated monomer mentioned later and having a weight average molecular weight of 500 or more and 30000 or less.

(Cellulose Ester)

There is no specific limitation in cellulose ester used for the cellulose ester film of the present invention. Cellulose molecule consists of many linked glucose units, and a glucose unit has three hydroxyl groups. The number of acyl groups introduced into the three hydroxyl groups is called a degree of substitution. For example, in cellulose triacetate, all three hydroxyl groups of a glucose unit are combined with an acetyl group.

The cellulose ester used for the present invention may be carboxylic ester having a carbon number of approximately 2 to 22 or may be ester of aromatic carboxylic acid and is specifically preferably lower fatty acid ester of cellulose. The lower fatty acid in the lower fatty acid ester of cellulose means fatty acid having a carbon number of 6 or less. An acyl group bonding to hydroxyl groups may be either a straight chain or branched, or may form a ring. Further, the acyl group may be substituted by other substituents. In the case of a same substitution degree, since double referaction is decreased when the aforesaid carbon number is large, a carbon number is preferably selected from acyl groups having a carbon number of 2 to 6. The carbon number as the aforesaid cellulose ester is preferably 2-4 and more preferably 2-3.

The aforesaid cellulose ester can also employ an acyl group derived from mixed acid and specifically preferably an acyl group having a carbon number of 2 and 3 or a carbon number of 2 and 4. As cellulose ester utilized in this invention, mixed fatty acid ester of cellulose in which a propionate group or a butyrate group other than an acetyl group is attached, such as cellulose acetate propionate, cellulose acetate butyrate or cellulose acetate propionate butyrate can be employed. A butyryl group constituting butyrate may be either a straight chain or branched. Cellulose ester specifically preferably utilized in this invention is cellulose acetate, cellulose acetate butyrate, cellulose acetate propionate or cellulose acetate phthalate.

Further, in order to exhibit a retardation value specified in the present invention, it can be appropriately controlled by the type of, the aforesaid acyl group of cellulose ester and a substitution degree of an acyl group to a pyranose ring of the cellulose resin skeleton.

The cellulose ester preferable in this invention is those simultaneously satisfying equations (1) and (2).

$$2.0 \leq X+Y \leq 3.0 \quad \text{Equation (1)}$$

$$0 \leq Y \leq 1.5 \quad \text{Equation (2)}$$

In the equations, X is a substitution degree of an acetyl group, Y is a substitution degree of an propionyl group or a butyryl group. Those satisfying the above-described 2 equations are suitable for manufacturing a cellulose ester film which exhibits excellent optical characteristics to meet an object of this invention.

Among them, triacetyl cellulose and cellulose acetate propionate are used preferably. In cellulose acetate propionate, X is in $1.0 \leq X \leq 2.5$, and it is preferable that Y and (X+Y) are $0.1 \leq Y \leq 1.5$ and $2.0 \leq X+Y \leq 3.0$. A substitution degree of an acyl group can be measured by a measurement method based on ASTM-D817-96.

When the aforesaid substitution degree of an acyl group is excessively low, the unreacted portion against hydroxyl groups of a pyranose ring constituting a skeleton of cellulose resin increases to make a large residual amount of said hydroxyl groups, resulting in decrease of ability to restrain variation of retardation depending on humidity and to protect a polarizer as polarizing plate protective film, which is not preferable.

The number average molecular weight of cellulose ester utilized in this invention is preferably in a range of 60,000 to 300,000 because of large mechanical strength of the obtained film. Those having a number average molecular weight of 70,000 to 200,000 are more preferably utilized.

The number average molecular weight of cellulose ester can be measured as follows.

Measurement is performed by high speed liquid chromatography under the following condition.

Solvent: Acetone
Column: MPW×1 (produced by Toso Co., Ltd.)
Sample concentration: 0.2 (weight/volume) %
Flow rate: 1.0 ml/min
Sample injection quantity: 300 µl
Standard sample: standard polystyrene
Temperature 23° C.

Cellulose as a starting material of cellulose ester utilized in this invention is not specifically limited, and includes such as cotton linter, wood pulp and kenaf. Further, cellulose ester prepared from them can be utilized by mixing each of them at an arbitrary ratio.

Cellulose ester according to this invention, in the case that an acylation agent as a cellulose starting material is an acid anhydride (an acetic anhydride, a propionic anhydride, a butyric anhydride), is prepared by a reaction utilizing a proton type catalyst such as sulfuric acid by use of an organic acid such as acetic acid or in an organic solvent such as methylene chloride. In the case that an acylation agent is an acid chloride ($CH_3COCl$, $C_2H_5COCl$, $C_3H_7COCl$), the reaction is performed utilizing a basic compound such as amine as a catalyst. Specifically, the synthesis can be performed with reference to a method described in JP-A 10-45804.

An average substitution degree of an acyl group at the 6-position of a glucose unit of cellulose ester utilized in this invention is preferably 0.5 to 0.9.

A highly reactive primary hydroxyl group is present at the 6-position of a glucose unit constituting cellulose ester, different from the 2-position and the 3-position, and this primary hydroxyl group preferentially forms sulfuric ester in a manufacturing process of cellulose ester employing sulfuric acid as a catalyst. Therefore, in an esterification reaction of cellulose, the average substitution degree at the 2-position and the 3-position of a glucose unit can be made larger that that at the 6-position by increasing the amount of sulfuric acid as a catalyst, compared to general cellulose ester. Further, when necessary, since a hydroxyl group at the 6-position of a glucose unit can be selectively protected when cellulose is tritylated, it is possible to make the average substitution degree at 2-position and the 3-position of a glucose unit larger than that at the 6-position, by protecting a hydroxyl group at the 6-position by tritylation and releasing a trityl group (a protective group) after esterification. Specifically, cellulose ester manufactured by a method described in JP-A 2005-281645 can be also preferably utilized.

In the case of acetyl cellulose, it is necessary to prolong the time of an acetylation reaction to increase an acetylation degree. However, when the reaction time is excessively long, decomposition will proceed simultaneously to cause such as cut off of a polymer chain and decomposition of an acetyl group, which leads to an unfavorable result. Therefore, it is necessary to set the reaction time of a certain range to increase the acetylation degree and depress decomposition to some extent. To regulate by reaction time is not suitable because the reaction conditions are various to be changed depending on the reaction equipment and installation and other conditions. Since molecular weight distribution is broadened as decomposition of polymer proceeds, also in the case of cellulose ester, the degree of decomposition can be determined by a value of weight average molecular weight (Mw)/number average molecular weight (Mn), which is generally utilized. That is, in a process of acetylation of cellulose triacetate, a value of weight average molecular weight (Mw)/number average molecular weight (Mn) can be utilized as one index not to advance decomposition too much due to prolonged reaction time but to perform acetylation reaction for sufficient time.

An example of a manufacturing method of cellulose ester will be shown below. Cotton linter of 100 weight parts as a cellulose starting material was crushed, being added with 40 weight parts of acetic acid, and the resulting system was subjected to a pre-treatment activation at 36° C. for 20 minutes. Thereafter, the system was added with 8 weight parts of sulfuric acid, 260 weight parts of acetic acid anhydride and 350 weight parts of acetic acid, and the resulting system was subjected to esterification at 36° C. for 120 minutes. After neutralization with 11 weight parts of a 24% magnesium acetate aqueous solution, saponification reipnig at 63° C. for 35 minutes was performed to prepare acetyl cellulose. The product, after having been stirred for 160 minutes at room temperature by use of 10 times of an acetic acid aqueous solution (acetic acid/water=1/1 (weight ratio)), was filtered and dried to prepare purified acetyl cellulose having an acetyl substitution degree of 2.75. This acetyl cellulose had Mn of 92,000, Mw of 156,000 and Mw/Mn of 1.7. In a similar manner, by adjusting esterification conditions (temperature, time, stirring) and hydrolysis conditions, cellulose ester having a different substitution degree and a different Mw/Mn can be synthesized.

Herein, cellulose ester synthesized is preferably subjected to purification to remove a low molecular weight component and to filtration to remove a component which has not been acetylated or has a low acetylation degree.

Further, mixed acid cellulose ester can be prepared by a method described in JP-A 10-45804.

Further, cellulose ester is also affected by trace amounts of metal components in cellulose ester. These are considered to be related with water utilized in a manufacturing process, and a component which forms insoluble nuclei is preferably as small as possible in quantity; and metal ions of such as iron, calcium and magnesium, which may form an insoluble product by salt formation with such as polymer decomposition product possibly containing an organic acid group, are preferably small in quantity. An iron (Fe) component is preferably not more than 1 ppm. A calcium (Ca) component is easily form a coordination compound, that is a complex, with a acid component such as carboxylic acid and sulfonic acid as well as with many ligands, to form many insoluble scum (insoluble sediment, muddiness) derived from calcium.

A calcium (Ca) component is not more than 60 ppm and preferably 0 to 30 ppm. A magnesium (Mg) component is preferably 0 to 70 ppm and specifically preferably 0 to 20 ppm, since an excess amount thereof also generates an insoluble product. Metal components such as a content of iron (Fe), calcium (Ca) and magnesium (Mg) can be analyzed by use of an ICP-AES (an induction coupling plasma emission spectrophotometer) after completely dried cellulose ester is subjected to pretreatment by a micro-digest wet decomposition apparatus (sulfuric nitric acid decomposition) and alkali fusion.

(Acrylic Polymer, Polyester)

Next, as a compound having a negative birefringence according to the present invention, an acrylic polymer having a negative birefringence and contained in the cellulose ester film according to the present invention will be explained.

In the cellulose ester film according to the present invention, it is characterized that the retardation value Ro defined by the formula (1) is in a range of 0 to 5 nm and the retardation value Rt defined by the formula (II) is in a range of −10 to 10 nm.

<Acrylic Polymer>

The cellulose ester film of the present invention preferably contains a polymer exhibiting negative double refraction in the stretching direction in order to satisfy both the aforementioned retardation values Ro and Rt simultaneously. Although there is no particular restriction on this polymer, it preferably contains a polymer having a weight average molecular weight of 500 or more and 30000 or less and obtained by polymerization of ethylenic unsaturated monomer, for example.

Especially, the cellulose ester film of the present invention preferably contains an acrylic polymer exhibiting negative double refraction in the stretching direction and having a weight average molecular weight of 500 or more and 30000 or less, and the acrylic polymer is an acrylic polymer having an aromatic ring in a side chain or an acrylic polymer having a cyclohexyl group in a side chain.

when the composition of this polymer is controlled by the polymer having the weight average molecular weight of 500 or more and 30000 or less, the compatibility between cellulose ester and this polymer can be made good. Especially, when the weight average molecular weight of an acrylic polymer, an acrylic polymer having an aromatic ring in a side chain or an acrylic polymer having a cyclohexyl group in a side chain is 500 or more and 10000 or less, a cellulose ester film after the film formation has an excellent transparency and a very low moisture vapor transmission degree in addition to the above, whereby it exhibits an excellent performance as an polarizing plate protective film.

Since the polymer has a weight average molecular weight of 500 or more and 30000 or less, it may be considered that the polymer belongs between an oligomer and a low molecular weight polymer. In order to produce such a polymer, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butylhydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Unexamined Patent Publication 2000-128911 or 2000-344823. These methods are all preferably used. The method according to the aforementioned Japanese Unexamined Patent Publication is used in particular preference.

The following lists up the monomers as monomer units constituting the polymer advantageous to the present invention, without the present invention being restricted thereto.

Ethylenic unsaturated monomer units constituting the polymer obtained by polymerization of the ethylenic unsaturated monomer are:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, vinyl benzoate and vinyl cinnamate;

an acrylic acid ester such as methyl acrylate, ethyl acrylate, propyl acrylate (i-, n-), butyl acrylate (n-, s-, t-), pentyl acrylate (n-, s-), hexyl acrylate (n-, i-), heptyl acrylate (n-, i-), octyl acrylate (n-, i-), nonyl acrylate (n-, i-), myristyl acrylate (n-, i-), cyclohexyl acrylate, (2-ethylhexyl) acrylate, benzyl acrylate, phenetyl acrylate, (ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, -p-hydroxy methylphenyl acrylate, and -p-(2-hydroxy ethyl) phenyl acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

The polymer made of the aforementioned monomers can be either copolymer or homopolymer. The preferably used polymer is a vinyl ester homopolymer, a vinyl ester copolymer or a copolymer between vinyl ester and acrylic acid or methacrylic acid ester.

In the present invention, the acryl polymer is defined as an acrylic acid or methacrylic acidalkyl ester homopolymer or copolymer without monomer unit containing an aromatic ring or cyclohexyl group. The acryl polymer having an aromatic ring on the side chain refers to the acryl polymer containing the acrylic acid or methacrylic acid ester monomer unit provided with aromatic ring. The acryl polymer having a cyclohexyl group on the side chain refers to the acryl polymer containing the acrylic acid or methacrylic acid ester monomer unit equipped with cyclohexyl group.

The acrylic acid ester monomer without aromatic ring or cyclohexyl group is exemplified by methyl acrylate, ethyl acrylate, propyl acrylate (i-, n-), butyl acrylate (n-, s-, t-), pentyl acrylate (n-, s-), hexyl acrylate (n-, i-), heptyl acrylate i-), octyl acrylate (n-, i-), nonyl acrylate (n-, i-), myristyl acrylate (n-, i-), (2-ethylhexyl) acrylate, (s-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, (2-methoxy ethyl) acrylate, and (2-ethoxy ethyl) acrylate, or these substances with the acrylate thereof replaced by methacrylate.

The acryl polymer is a homopolymer or copolymer of the aforementioned monomer. It preferably contains 30% by mass or more of the acrylic acid methyl ester monomer unit, and 40% by mass or more of the methacrylic acid methyl ester monomer unit. The homopolymer of methyl acrylate or methyl methacrylate is particularly preferred.

The acrylic acid or methacrylic acid ester monomer containing the aromatic ring is exemplified by phenyl acrylate, phenyl methacrylate, (2- or 4-chlorophenyl) acrylate, (2- or 4-chlorophenyl) methacrylate, (2-, 3- or 4-ethoxycarbonylphenyl) acrylate, (2-, 3- or 4-ethoxycarbonylphenyl) methacrylate, (o-, m- or p-tolyl) acrylate, (o-, m- or p-tolyl) methacrylate, benzyl acrylate, benzyl methacrylate, phenethyl acrylate, phenethyl methacrylate, and (2-naphthyl) acrylate. Benzyl acrylate, benzyl methacrylate, phenethyl acrylate, and phenethyl methacrylate can preferably be used.

The acryl polymer having aromatic ring on the side chain preferably contains 20 through 40% by mass of the acrylic acid or methacrylic acid ester monomer unit having the aromatic ring, and 50 through 80% by mass of acrylic acid or methacrylic acid methyl ester monomer unit. The aforementioned polymer preferably contains 2 through 20% by mass of acrylic acid or methacrylic acid ester monomer unit containing the hydroxyl group.

The acrylic acid ester monomer containing the cyclohexyl group is exemplified by cyclohexyl acrylate, cyclohexyl methacrylate, (4-methyl cyclohexyl) acrylate, (4-methyl cyclohexyl) methacrylate, (4-ethyl cyclohexyl) acrylate, and (4-ethyl cyclohexyl) methacrylate. The acrylic acid cyclohexyl and methacrylic acid cyclohexyl can preferably be employed.

The acryl polymer having a cyclohexyl group on the side chain preferably includes 20 through 40%, and 50 through 80% by mass of acrylic acid or methacrylic acid ester monomer unit containing a cyclohexyl group. The aforementioned polymer preferably includes 2 through 20% by mass of the acrylic acid or methacrylic acid ester monomer unit containing the hydroxyl group.

The polymer and acryl polymer obtained by polymerization of the aforementioned ethylenic unsaturated monomer; acryl polymer having the aromatic ring on the side chain; and acryl polymer having the cyclohexyl group on the side chain all provide excellent compatibility with the cellulose resin.

The acrylic acid or methacrylic acid ester monomer having the aforementioned hydroxyl group is based on the structural unit of a copolymer, not homopolymer. In this case, acrylic acid or methacrylic acid ester monomer unit including the hydroxyl group preferably accounts for 2 through 20% by mass in the acryl polymer.

In the present invention, the polymer including a hydroxyl group on the side chain can be preferably utilized. Similarly to the case of the aforementioned monomer, acrylic acid or methacrylic acid ester is preferably used as the monomer unit having a hydroxyl group, and is exemplified by (2-hydroxy ethyl) acrylate, (2-hydroxy propyl) acrylate, (3-hydroxy propyl) acrylate, (4-hydroxy butyl) acrylate, (2-hydroxy butyl) acrylate, p-hydroxy methylphenyl acrylate, p-(2-hydroxy ethyl) phenyl acrylate, or the same wherein the aforementioned acrylic acid is replaced by the methacrylic acid. Use of the acrylic acid-2-hydroxy ethyl acrylate, and 2-hydroxy ethyl methacrylate is preferred. Preferably 2 through 20% by mass, more preferably 2 through 10% by mass of the acrylic acid ester or methacrylic acid ester monomer unit having a hydroxyl group in the polymer is included in the polymer.

It goes without saying that the aforementioned polymer including 2 through 20% by mass of monomer unit containing the aforementioned hydroxyl group provides excellent miscibility with the cellulose ester, outstanding retentivity and dimensional stability, minimized moisture permeability, and prominent dimensional stability, superb adhesiveness with polarizer as a polarizing plate protective film and improved durability of the polarizing plate.

There is no restriction to the method for allowing at least one of the terminals of the principal chain of the acryl polymer to have a hydroxyl group, if such a method ensures a hydroxyl group to be provided on the terminal of the principle chain in particular. Such a method is exemplified by: the method of using such a radical polymerization initiator including a hydroxyl group as azobis (2-hydroxy ethylbutylate); the method of using such a chain transfer agent having a hydroxyl group as 2-mercaptoethanol; the method of using a polymerization terminator having a hydroxyl group; the method of ensuring the hydroxyl group to be provided on the terminal by living ion polymerization; and the method of bulk polymerization based on polymerization catalyst through the use of a compound containing one thiol group and secondary hydroxyl group or through the combined use of this compound and organic metal compound, as disclosed in the Japanese Non-Examined Patent Publication 2000-128911 or 2000-344823. Use of the method disclosed in the Japanese Non-Examined Patent Publication is preferred in particular. The polymer manufactured by the method disclosed therein is available on the market under the trade name of Actflow Series manufactured by Soken Kagaku Co., Ltd. This is preferably used. The polymer having a hydroxyl group on the aforementioned terminal and/or the polymer having a hydroxyl group on the side chain provides a substantial improvement of the compatibility and transparency of the polymer.

As the ethylenic unsaturated monomer showing a negative birefringence to the stretching direction, a polymer using a styrene may be employed in order to exhibit a negative refractility. Such styrene is exemplified by styrene, methyl styrene, dimethyl styrene, trimethyl styrene, ethyl styrene, isopropyl styrene, chloromethyl styrene, methoxy styrene, acetoxystyrene, chlorostyrene, dichloro styrene, bromostyrene, and vinyl methyl benzoate ester, without being restricted thereto. Polymerization can be made with the monomers mentioned as the aforementioned unsaturated ethylenic monomers, or two or more aforementioned polymers can be used to achieve compatibility with the cellulose resin for the purpose of controlling the double refraction.

Further, the cellulose ester film of the present invention preferably contains:

a polymer X having a weight average molecular weight of 2000 or more and 30000 or less and obtained by copolymerization between an ethylenic unsaturated monomer Xa which does not have an aromatic ring and a hydrophilic group in its molecule, an ethylenic unsaturated monomer Xb which does not have an aromatic ring and has a hydrophilic group in its molecule and a copolymerizable ethylenic unsaturated monomer except Xa and Xb, or a polymer Y having a weight average molecular weight of 500 or more and 30000 or less and obtained by polymerization of an ethylenic unsaturated monomer Ya not having an aromatic ring and an ethylenic unsaturated monomer compolymerizable with Ya.

<Polymer X and Polymer Y>

Various methods are known as a way of adjusting Ro and Rth of the present invention and anyone can be adopted. However, from a point of transparency, it is desirable that a cellulose ester film contains a polymer X having an average molecular weight of 2000 to 30000 and obtained by copolymerization of an ethylenic unsaturated monomer Xa not having an aromatic ring and a hydrophilic group in a molecule thereof, an ethylenic unsaturated monomer Xb having a hydrophilic group and not having an aromatic ring in a molecule thereof, and a copolymerizable ethylenic unsaturated monomer except Xa and Xb, and preferably contains a polymer Y having an average molecular weight of 500 to 3000 and obtained by polymerization of an ethylenic unsaturated monomer Ya not having an aromatic ring and an ethylenic unsaturated monomer compolymerizable with Ya.

Generally, it is known that a substance having an aromatic ring in a main chain among a monomer has positive birefringence as well as the birefringence of cellulose ester. Therefore, since it does not cancel the retardation value Rth of a cellulose ester film, it is preferable to add a material having a negative birefringence in a film.

A polymer X used in the present invention is a polymer having a weight average molecular weight of 2000 or more without exceeding 30000, obtained by copolymerization between an ethylenic unsaturated monomer Xa without containing aromatic ring and hydrophilic group in its molecule and an ethylenic unsaturated monomer Xb containing a hydrophilic group without an aromatic ring in its molecule.

Preferably, Xa is an acryl monomer or a methacryl monomer each not having an aromatic ring and a hydrophilic group in a molecule thereof and Xb is an acryl monomer or a methacryl monomer each having a hydrophilic group and not having an aromatic ring in a molecule thereof.

The polymer X used in the present invention is expressed by the following Formula (1):

-(Xa)$_m$-(Xb)$_n$-(Xc)$_p$-      Formula (1)

(in Formula (1), Xa is an ethylenic unsaturated monomer not having an aromatic ring and a hydroxyl group in its molecule, Xb is an ethylenic unsaturated monomer not having an aromatic ring and having a hydroxyl group in its molecule, and Xc is a copolymerizable ethylenic unsaturated monomer except Xa and Xb. m, n, and p represent a mole composition ratio, provided that m is not 0, n is not 0, k is not 0, and m+n+p=100.

Further, preferable examples of the polymer (X) include a polymer represented by the following Formula (1-1):

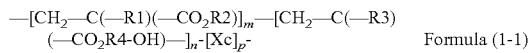

—[CH$_2$—C(—R1)(—CO$_2$R2)]$_m$—[CH$_2$—C(—R3)
(—CO$_2$R4-OH)—]$_n$-[Xc]$_p$-      Formula (1-1)

In the above Formula (1-1), R$_1$ and R$_3$ represent a hydrogen atom or a methyl group, R$_2$ represents an alkyl group or a cycloalkyl each having carbon atoms of 1 to 12, and R$_4$ represents —CH$_2$—, —C$_2$H$_4$—, or —C$_3$H$_6$—. Xc represents a monomer unit polymerizable with [CH$_2$—C(—R1)(—CO$_2$R2)] or [CH$_2$—C(—R3) (—CO$_2$R4-OH)—]. m, n and p represent a mole composition ratio, provided that m is not 0, n is not 0, k is not 0, and m+n+p=100.)

Although examples of monomers as a monomer unit constituting the polymer X related to the present invention are listed below, the monomer is not limited to these.

In X, the hydroxyl group refers not only to a hydroxyl group but to a group having an ethylene oxide chain.

The ethylenic unsaturated monomer Xa without containing either aromatic ring or hydrophilic group in a molecule is exemplified by methyl acrylate, ethyl acrylate, propyl acrylate (i-, n-), butyl acrylate (n-, s-, t-), pentyl acrylate (n-, s-), hexyl acrylate (n-, i-), heptyl acrylate (n-, i-), octyl acrylate (n-, i-), nonyl acrylate (n-, i-), myristyl acrylate (n-, i-), (2-ethylhexyl) acrylate, (ε-caprolactone) acrylate, or a monomer in which the above acrylic ester is changed to a methacrylic ester. Among them, methyl acrylate, ethyl acrylate, methyl methacrylate, ethyl methacrylate or propyl methacrylate (i-, n-) is preferably used.

The ethylenic unsaturated monomer Xb containing the hydrophilic group without an aromatic ring in the molecule is preferably an acrylic acid or methacrylic acid ester as a monomer unit having a hydroxyl group. The preferred one is exemplified by (2-hydroxy ethyl) acrylate, (2-hydroxy propyl) acrylate, (3-hydroxy propyl) acrylate, (4-hydroxy butyl) acrylate, and (2-hydroxy butyl) acrylate, or these substances with the acrylate thereof replaced by methacrylate. Of these, (2-hydroxy ethyl) acrylate, (2-hydroxy ethyl) methacrylate, (2-hydroxy propyl) acrylate, and (3-hydroxy propyl) acrylate are more preferably used.

If a monomer as Xc is a copolymerizable ethylenic unsaturated monomer other than Xa and Xb, the monomer is not limited, however, it is desirable that the monomer has not an acromatic ring.

The mole composition ratio m:n of Xa and Xb is preferably in the range of 99:1 to 65:35, more preferably in the range of 95:5 to 75:25. The mole composition ratio "p" of Xc is 0 to 10. Xc may be a plurality of monomer units.

If the mole composition ratio Xa is greater, compatibility with the cellulose ester will be improved but retardation value Rth along the film thickness will be increased. Further, the mole composition ratio of Xb exceeds the above range, haze may be caused at the time of film production. It may desirable to optimize these and determine the mole composition ratio of Xa and Xb.

The polymer X preferably has a weight average molecular weight of 5000 or more without exceeding 30000, more preferably a weight average molecular weight of 80.00 or more without exceeding 25000.

If the molecular weight is greater than 5000, there are such advantages as smaller dimensional variation of the cellulose ester film at a high temperature and humidity and smaller curl as a polarizing plate protective film. When the weight average molecular weight does not exceeds 30000, compatibility with cellulose ester will be improved, refraining a problem as bleed-out at a high temperature and high humidity or an optical haze immediately after formation of the film.

The weight average molecular weight of polymer X in the present invention can be adjusted by the known method for molecular weight adjustment. Such a method for molecular weight adjustment can be exemplified by the method of adding a chain transfer agent such as carbon tetrachloride, laurylmercaptan, and octyl thioglycolate. The polymerization temperature is kept within the range from room temperature through 130° C., preferably from 50 through 100° C. This temperature or polymerization reaction time can be adjusted.

The weight average molecular weight can be measured according to the following method:

(Method of Measuring the Molecular Weight)

The weight average molecular weight Mw is measured by gel permeation chromatography.

The following describes the measurement conditions:
Solvent: methylene chloride
Column: Shodex K806, K805 and K803G (Three pieces manufactured by Showa Denko K.K. were connected for use)
Column temperature: 25 degrees Celsius
Sample concentration: 0.1% by mass
Detector: RI Model 504 (manufactured by GL Science Co., Ltd.)
Pump: L6000 (manufactured by Hitachi Limited)
Flow rate: 1.0 ml/min.
Calibration curve: The calibration curve using 13 samples of the standard polystyrene STK standard polystyrene (manufactured by Toso Co., Ltd.) was employed, wherein Mw 1000000 through 500. These 13 samples were placed at an approximately equally spaced interval.

The polymer Y used in the present invention is a polymer having a weight average molecular weight of 500 or more without exceeding 3000, being produced by polymerization of ethylenic unsaturated monomer Ya without aromatic ring. If the polymer has a weight average molecular weight of 500 or more, it is desirable, because the amount of the remaining monomer will be reduced. If the weight average molecular weight is 3000 or less, it is desirable, because the performance for reducing the level of retardation Rt can be maintained. Ya is preferably an acryl monomer or a methacryl monomer each not having an aromatic ring.

A polymer Y used in the present invention is preferably expressed by the following Formula (2):

$$-[Ya]_k\text{-}[Yb]_q\text{-} \quad \text{Formula (2)}$$

In the above Formula (2), Ya is an ethylenic unsaturated monomer not having an aromatic ring'in its molecule and Yb is an ethylenic unsaturated monomer copolymerizable with Ya. k and q represent a mole composition ratio, provided that k is not 0, q is not 0 and k+q=100.

Further, preferable examples of the polymer Y related to the present invention include a polymer represented by the following Formula (2-1):

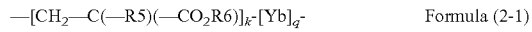

$$-[CH_2-C(-R5)(-CO_2R6)]_k\text{-}[Yb]_q\text{-} \quad \text{Formula (2-1)}$$

(In the above Formula (2-1), R5 is a hydrogen atom or a methyl group, and R6 is an alkyl group or a cycloalkyl group having a carbon number of 1 to 12. Yb is a monomer unit polymerizable with [CH$_2$—C(—R5)(—CO$_2$R6)]. k and q are a mole composition ratio, provided that k is not 0, and k+p=100.)

Yb is not specifically limited, as far as it is an ethylenic unsaturated monomer copolymerizable with [CH$_2$—C(—R5)(—CO$_2$R6)] being Ya. Yb may be plural. k+q=100, and q is preferably 1 to 30.

The ethylenic unsaturated monomer Ya constituting the polymer Y obtained by polymerization of the ethylenic unsaturated monomer without containing an aromatic ring is exemplified by:

an acrylic acid ester such as methyl acrylate, ethyl acrylate, propyl acrylate (i-, n-), butyl acrylate (n-, s-, t-), pentyl acrylate (n-, s-), hexyl acrylate (n-, i-), heptyl acrylate. (n-, i-), octyl acrylate (n-, i-), nonyl acrylate myristyl acrylate (n-, i-), cyclohexyl acrylate, (2-ethylhexyl) acrylate, (s-caprolactone) acrylate, (2-hydroxyethyl) acrylate, (2-hydroxypropyl) acrylate, (3-hydroxypropyl) acrylate, (4-hydroxybutyl) acrylate, (2-hydroxybutyl) acrylate;

a methacrylic acid ester such as the one with the aforementioned acrylate replaced by methacrylate; and an unsaturated acid such as acrylic acid, methacrylic acid, maleic anhydride, crotonic acid and itaconic acid.

A monomer as Yb is not specifically limited, if the monomer is an ethylenic unsaturated monomer copolymerizable with Ya. The monomer as Yb is exemplified by:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, and vinyl cinnamate. Yb may be plural.

When producing such a polymer X and Y, the molecular weight cannot be easily controlled by the conventional polymerization. In this case, it is preferred to use a method capable of ensuring the uniform molecular weight without much increasing the molecular weight. Such a preferred polymerization method is exemplified by: a method of using the peroxide polymerization initiator such as cumene peroxide and t-butyl hydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used. Especially, for the polymer Y, a polymerization method which uses a compound having a thiol group and a hydroxyl group of a 2nd class in a molecule as a chain transfer agent, is desirable. In this case, at a terminal end of the polymer Y, it has a hydroxyl group resulting from a polymerization catalyst and a chain transfer agent and thioether. With this terminal residue group, the compatibility of Y and cellulose ester can be adjusted.

The hydroxyl group value of the polymer X is preferably 30 through 150 [mg KOH/g].

(Method of Measuring the Hydroxyl Group Value)

The hydroxyl group value was measured according to the JIS K 0070 (1992). The hydroxyl group value can be defined as the value in terms of mg of the potassium hydroxide required to neutralize the acetic acid bonded with the hydroxyl group, when 1 g of the sample is acetylated. To put it more specifically, the following steps were taken: weighing X g (about 1 g) of sample accurately; putting it into a flask; adding 20 ml of acetylation reagent (pyridine added to 20 ml of acetic anhydride to get 400 ml) accurately thereto; providing the outlet of the flask with an air cooling tube; healing the solution in a glycerine bath having a temperature of 95 through 100 degrees Celsius; cooling the solution after the lapse of one hour and 30 minutes; and adding 1 ml of purified water 1 ml through the air cooling tube so that the acetic anhydride was decomposed into acetic acid. This was followed by the step of titration by a potential difference titration apparatus using a 0.5 mol/L potassium hydroxide ethanol solution. The inflection point of the titration curve having been obtained was defined as a terminal point. Then titration was carried out in an idle test wherein a sample was not put therein. Thus, the inflection point of the titration curve was obtained, and the hydroxyl group value was calculated according to the following Equation.

$$\text{Hydroxyl group value} = \{(B-C) \times f \times 28.05/X\} + D$$

where B denotes the amount (ml) of 0.5 mol/L potassium hydroxide ethanol solution used in the idle test, C indicates the amount (ml) of 0.5 mol/L potassium hydroxide ethanol solution used in the titration, f shows the factor of 0.5 mol/L potassium hydroxide ethanol solution, D represents an acid value, and 28.05 is equivalent to a half of 56.11 as 1 mol potassium hydroxide.

The above-mentioned polymer X and polymer Y each excels in compatibility with a cellulose ester. Also these polymers have neither evaporation nor volatilization, these polymers are excellent in manufacturing efficiency, and their permanence properties as a protection film for polarizing plates are preferable, and their water vapour permiability is small, and they are excellent in dimensional stability.

The contents of the polymers X and Y in the cellulose ester film preferably meet the following Formulae (i) and (ii): assuming that the content of the polymer X is Xg (W by mass=the mass of the polymer X/the mass of the cellulose ester×100), and that of the polymer Y is Yg (W by mass), $$5 \leq Xg+Yg \leq 35 \text{ (\% by mass)} \qquad \text{Formula (i)}$$

$$0.05 \leq Yg/(Xg+Yg) \leq 0.4 \qquad \text{Formula (ii)}$$

where Formula (1) is preferably in the range from 10 through 25% by mass (or weight).

When the total amount of the polymers X and Y must be 5% by mass or more; a sufficient reduction in retardation value Rt can be achieved. Further, when the total amount is 35% by mass or less; the adhesiveness of the polarizer PVA will be excellent.

The polymers X and Y as materials constituting the aforementioned doping solution can be directly added and dissolved. Alternatively, they can be put into the doping solution after having been dissolved in the organic solvent for dissolving the cellulose ester.

<Polyester>

(Polyester Represented by Formula (3) or (4))

Cellulose ester film of this invention preferably contains also polyester represented by following Formula (3) or (4).

$$B_1\text{-}(G\text{-}A\text{-})_m G\text{-}B_1 \qquad \text{Formula (3)}$$

(in Formula (3), $B_1$ represents a mono-carboxylic acid; G represents a divalent alcohol; and A represents a dibasic acid. Neither of $B_1$, G and A contains an aromatic ring. m is a repeating number.)

$$B_2\text{-}(G\text{-}A\text{-})_n A\text{-}B_2 \qquad \text{Formula (4)}$$

(in Formula (4), $B_2$ represents a mono-alcohol; G represents a divalent alcohol; and A represents a dibasic acid. Neither of $B_2$, G and A contains an aromatic ring. n is a repeating number.)

The monocarboxylic acid represented by $B_1$ is not specifically limited and aliphatic monocarboxylic acid and alicyclic monocarboxylic acid well known in the art can be utilized.

Preferable monocarboxylic acid includes the following, however, this invention is not limited thereto.

As aliphatic monocarboxylic acid, utilized is fatty acid provided with a straight chain or a side chain and having 1 to 32 carbon atoms, more preferably 1 to 20 and specifically preferably 1 to 12. To incorporate acetic acid is preferable because compatibility with cellulose ester is increased, and it is also preferable to utilize a mixture of acetic acid with other monocarboxilic acid.

Preferable aliphatic monocarboxylic acid includes saturated fatty acid such as formic acid, acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid and arachidic acid.

As mono-alcohol component represented by $B_2$ is not specifically limited, and alcohols well known in the art can be utilized. For example, straight chain or branched aliphatic saturated alcohol or aliphatic unsaturated alcohol having 1 to 32 carbon atoms, can be preferably utilized. The carbon number is more preferably 1 to 20, and specifically preferably 1 to 12.

A divalent alcohol component represented by G includes the following; however, this invention is not limited thereto. Listed are such as ethylene glycol, diethylene glycol, 1,2-propylene glycol, 1,3-propylene glycol, 1,2-butylene glycol, 1,3-butylene glycol, 1,4-butylene glycol, 1,5-pentanediol, 1,6-hexanediol, 1,5-pentylene glycol, diethylene glycol, triethylene glycol and tetraethylene glycol; among them, ethylene glycol, 1,2-propylene glycol, 1,3-propylene glycol, 1,2-butylene glycol, 1,3-butylene glycol, 1,4-butylene glycol, 1,6-hexanediol, diethylene glycol and triethylene glycol are preferable; and further, 1,3-propylene glycol, 1,4-butylene glycol, 1,6-hexanediol and diethylene glycol are more preferably utilized.

A dibasic acid (dicarboxylic aciod) component represented by A is preferably aliphatic dibasic acid and alicyclic dibasic acid, and utilized is at least one selected from, such as malonic acid, succinic acid, glutalic acid, adipic acid, pimeritic acid, suberic acid, azeric acid, sebacic acid, undecane dicarboxylic acid and dodecane dicarboxylic acid; and specifically, those having a carbon number of 4-12 as aliphatic dicarboxylic acid. That is, not less than two types of dibasic acid may be utilized in combination.

m and n are a repeating number and is preferably not less than 1 and not more than 170.

(Polyester Represented by Formula (5) or (6))

Cellulose ester film of this invention preferably contains also polyester represented by following Formula (5) or (6).

$$B_1'\text{-}(G'\text{-}A'\text{-})_m G'\text{-}B_1' \qquad \text{Formula (5)}$$

(in Formula (5), $B_1'$ represents a mono-carboxylic acid having a carbon number of 1 to 12; G' represents a divalent alcohol having a carbon number of 2 to 12; and A' represents a dibasic acid having a carbon number of 2 to 12. Neither of $B_1'$, G' and A' contains an aromatic ring. m' is a repeating number.)

$$B_2'\text{-}(A'\text{-}G'\text{-})_n A'\text{-}B_2' \qquad \text{Formula (6)}$$

(in Formula (6), $B_2'$ represents a mono-alcohol having a carbon number of 1 to 12; G' represents a divalent alcohol having a carbon number of 2 to 12; and A' represents a dibasic acid having a carbon number of 2 to 12. Neither of $B_2'$, G' and A' contains an aromatic ring. n' is a repeating number.)

$B_1'$ and $B_2'$ are synonymous with $B_1$ and $B_2$ in the above-mentioned Formula (3) and (4).

G' and A' are an alcohol components or dibasic acid components having a carbon numbers 2 to 12 among G or A in the above-mentioned Formula (3) and (4).

A weight average molecular weight of polyester is preferably not more than 20,000 and more preferably not more than 10,000. Specifically polyester having a weight average molecular weight of 500 or more and 10,000 or less is excellent in compatibility with cellulose ester as well as hardly causes evaporation and vaporization during casting.

Condensation polymerization of polyester is performed by means of an ordinary method. For example, it can be easily synthesized by a direct reaction of the above-described dibasic acid with glycol; a heat melt condensation method by a polyesterification reaction of the above-described dibasic acid or alkylesters thereof, such as a polyesterification reaction or an ester exchange reaction of methylester of dibasic acid with glycols; or a dehydrohalogenide reaction of acid chloride of these acid and glycol, however, polyester having not so large weight average molecular weight is preferably synthesized by a direct reaction. Polyester having a high distribution in the low molecular weight side has very good compatibility with cellulose ester, and cellulose ester film having small water vapor permeability and excellent transparency can be prepared. As a controlling method of a molecular weight, a conventional method can be utilized without specific limitation. For example, although it depends on a polymerization condition, by a method to shield a molecular terminal by mono-valent acid (monocarboxylic acid) or mono-hydric alcohol (monoalcohol) and the control is possible by an addition amount of these mono-valent compounds. In this case, monovalent acid is preferable with respect to stability of polymer. For example, listed are such as acetic acid, propionic acid and butyric acid, and selected are those which is not evaporated out of the system during condensed polymerization but can be easily evaporated out of the system when the reaction is stopped and such a monovalent acid is removed out of the system, however, these may be utilized as a mixture. Further, in the case of a direct reaction, the weight average molecular weight can be controlled also by judging the timing to stop the reaction based on the quantity of water evaporated out during the reaction. In addition to these, the molecular weight control is possible also by biasing a mol number of glycol or dibasic acid which are charged, as well as by controlling the reaction temperature.

Polyester according to this invention is preferably contained at 1-40 weight % to cellulose ester, polyester represented by Formula (5) or (6) is more preferably at 2-30 weight % and specifically preferably at 5-15 weight % against cellulose ester.

By use of a film in which polyester is added, a polarizing plate with less deterioration due to high temperature and high humidity can be obtained. Further, by use of this polarizing plate, an IPS mode type liquid crystal display capable of maintaining high contrast and wide view angle for long term and excellent in surface flatness.

(Plasticizer)

The cellulose ester film of the present invention may contain other plasticizers in addition to compounds having birefringence to the above-mentioned negative stretching direction and compounds having positive birefringence. The plasticizer is not specifically limited, however, is preferably selected from such as a polycarboxylic ester type plasticizer, a glycolate type plasticizer, a phthalic ester type plasticizer, a fatty acid ester type plasticizer, a polyhydric alcohol ester type plasticizer, a polyester type plasticizer and an acryl type plasticizer. When not less than two types among them are utilized, at least one type is preferably a polyhydric alcohol ester type plasticizer.

A polyalcohol ester consists of an ester of an aliphatic polyalcohol having a valence of two or more and monocarboxylic acid, and preferably includes an aromatic ring or a cycloalkyl ring in a molecule. It is preferably divalent to 20-valent aliphatic polyalcohol ester.

A polyalcohol used in the present invention is represented by formula (7)

$$R^1-(OH)_n \quad \text{Formula (7)}$$

Wherein: $R^1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof. Among them, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups.

Specific examples of polyalcohol esters are shown below:
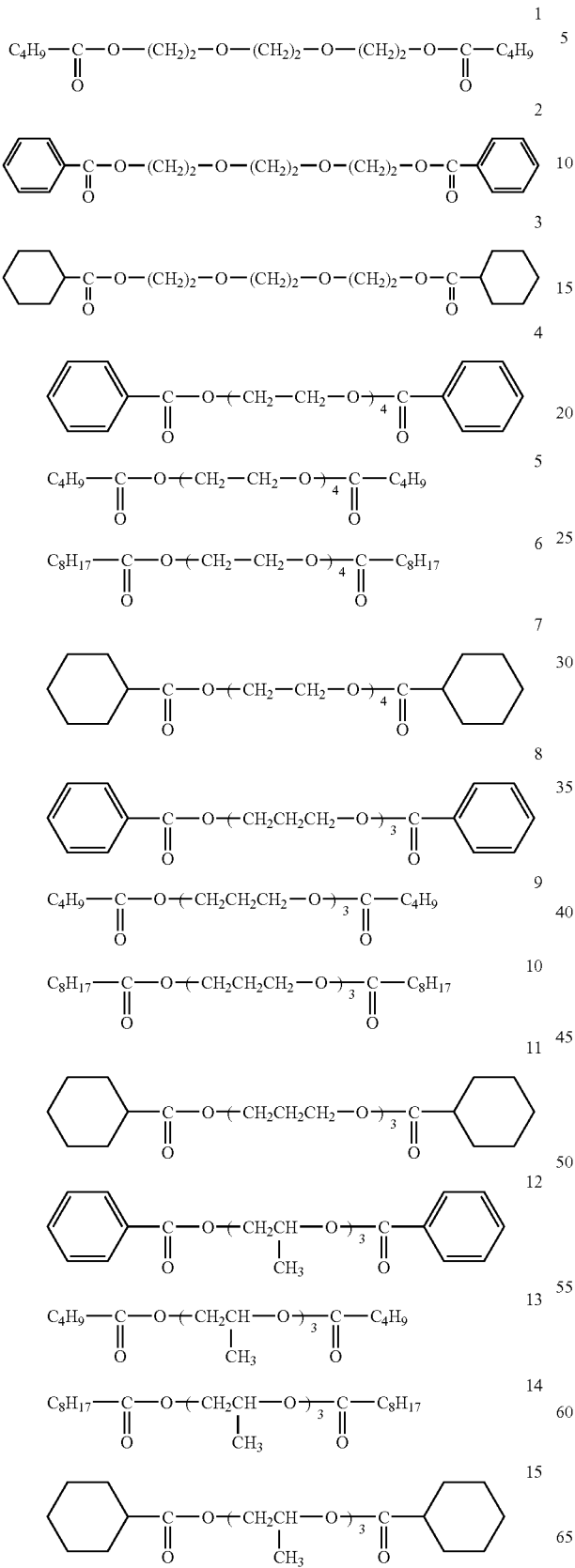
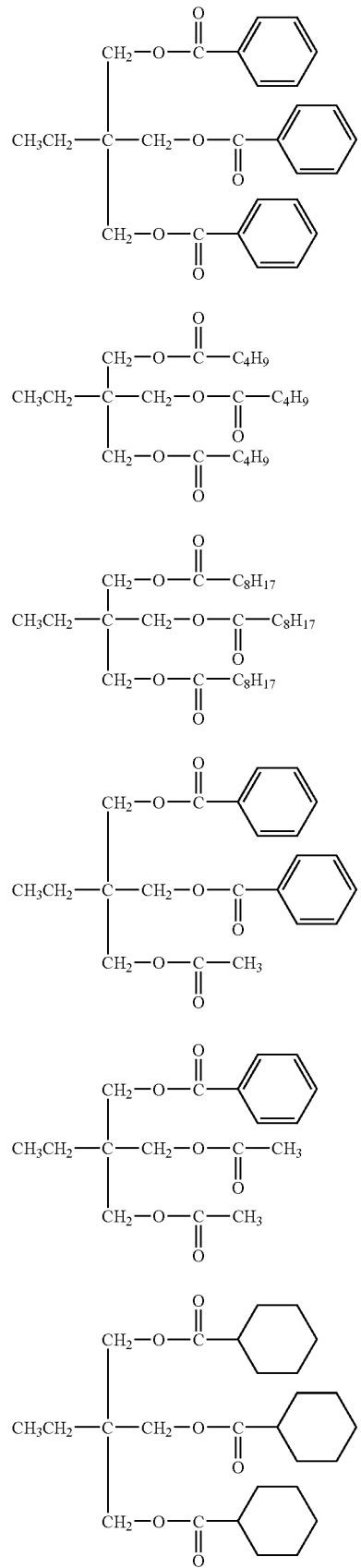

22
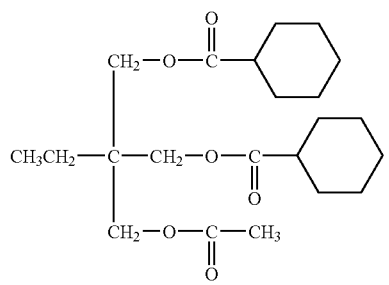
23
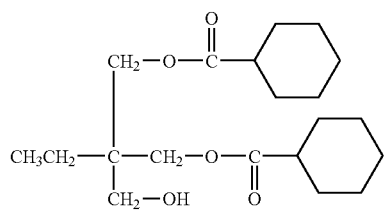
24
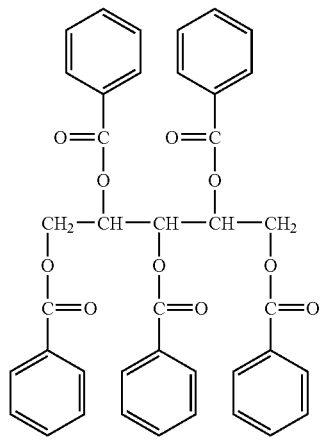
25
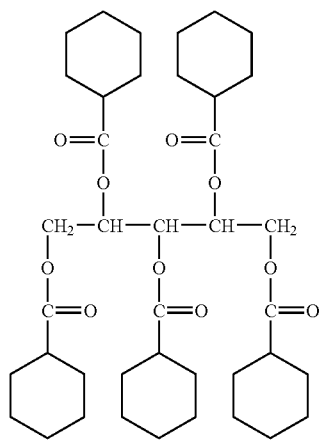
26
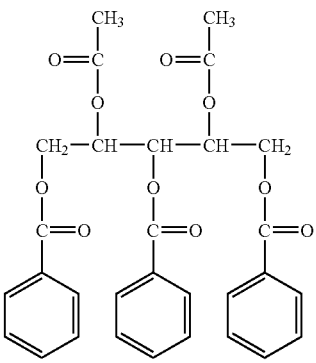
27
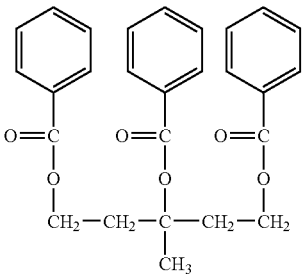
28
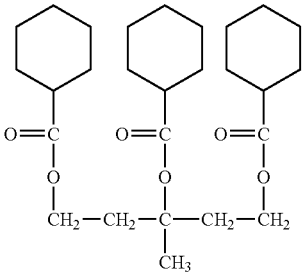
29
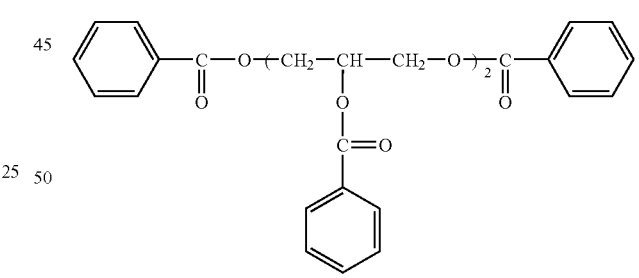
30
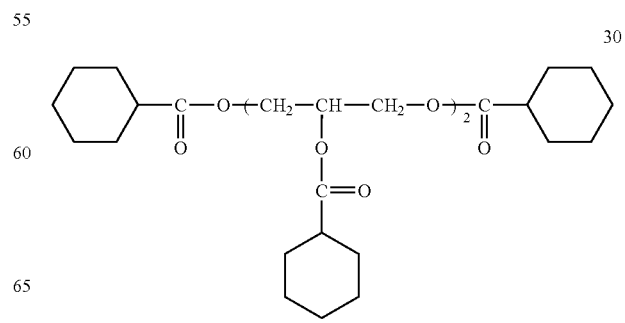

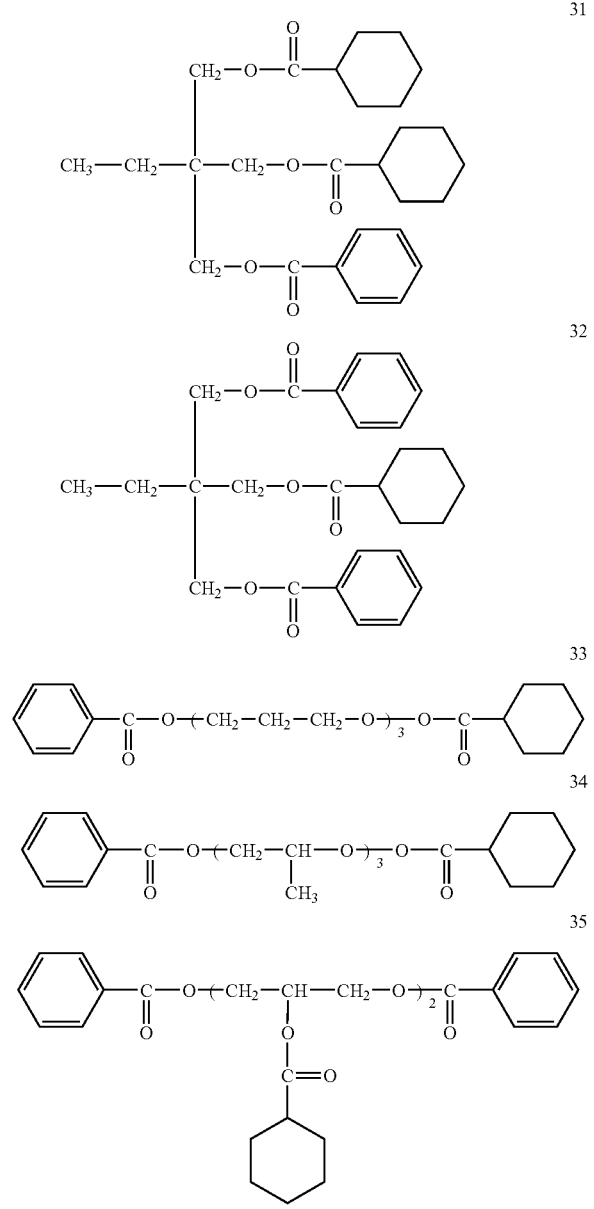

A glycolate type plasticizer is not specifically limited, however, alkylphthalylalkyl glycolates are preferably utilized. Alkylphthalylalkyl glycolates include such as methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthlylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalate ester type plasticizer includes such as diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citric ester type plasticizer includes such as acetyltrimethyl citrate, acetyltriethyl citrate and acetyltributyl citrate.

A fatty acid ester type plasticizer includes such as butyl oleate, methylacetyl ricinoleate and dibutyl sebacate.

A phosphoric ester type plasticizer includes such as triphenyl phosphate, tricresyl phosphate, cresyldiphenyl phosphate, octyldiphenyl phosphate, diphenylbiphenyl phosphate, trioctyl phosphate and tributyl phosphate.

Polycarboxylic ester compound is comprised of ester of polycarboxylic acid of not less than 2 valences, preferably of 2-20 valences, and alcohol. Further, aliphatic polycarboxylic acid is preferably of 2-20 valences. In the case of aromatic polycarboxylic acid and alicyclic polycarboxylic acid, 3-20 valences are preferable.

Polycarboxylic acid is represented by following Formula (8).

$$R^2(COOH)_m(OH)_n \qquad \text{Formula (8)}$$

(wherein, $R^2$ is an (m+n) valent organic group; m is an integer of not less than 2; n is an integer of not less than 0; COOH group is a carboxyl group; and OH group is an alcoholic or phenolic hydroxyl group.)

Examples of preferable polycarboxylic acid include the following, however, this invention is not limited thereto. Aromatic polycarboxylic acid of not less than 3 valences such as trimellitic acid, trimesic acid and pyromellitic acid, and derivatives thereof; aliphatic polycarboxylic acid such as succinic acid, adipic acid, azelaic acid, sebasic acid, oxalic acid, fumaric acid, maleic acid and tetrahydrophthalic acid; oxypolycarboxylic acid such as tartaric acid, tartronic acid, malic acid and oxalic acid; can be preferably utilized. It is specifically preferable to utilize oxypolycarboxylic acid with respect to such as improvement of reservability.

Alcohol utilized in a polycarboxylic ester compound, which can be utilized in this invention, is not specifically limited and alcohols and phenols well known in the art can be utilized. For example, straight chain or branched aliphatic saturated alcohol or aliphatic unsaturated alcohol, having a carbon number of 1-32, can be preferably utilized. The carbon number is more preferably 1-20 and specifically preferably 1-10. Further, such as alicyclic alcohol such as cyclopentanol and cyclohexanol or derivatives thereof, and aromatic alcohol such as benzyl alcohol and cinnamyl alcohol or derivatives thereof can be also preferably utilized.

When oxypolycarboxylic acid as polyvalent carboxylic acid is utilized, an alcoholic or phenolic hydroxyl group of polycarboxylic acid may be esterified by use of monocarboxylic acid. Preferable monocarboxylic acid includes the following; however, this invention is not limited thereto.

As aliphatic monocarboxylic acid, straight chain or branched fatty acid having a carbon number of 1 to 32 is preferably utilized. The carbon number is more preferably 1 to 20 and specifically preferably 1 to 10.

Preferable aliphatic monocarboxylic acid includes saturated fatty acid such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid and arachidic acid.

Examples of preferable alicyclic monocarboxylic acid include cyclopentane carboxylic acid, cyclohexane carboxylic acid and cyclooctane carboxylic acid; or derivatives thereof.

Examples of preferable aromatic monocarboxylic acid include those in which an alkyl group is introduced in a benzene ring of benzoic acid such as benzoic acid and toluic acid; aromatic monocarboxylic acid having at least two benzene rings such as biphenyl carboxylic acid, naphthaline carboxylic acid and tetraline carboxylic acid, or derivatives thereof. Acetic acid, propionic acid and benzoic acid are specifically preferable.

The molecular weight of a monocarboxylic ester compound is not specifically limited, however, is preferably in a range of 300 to 1,000 and more preferably in a range of 350 to 750. The molecular weight is preferably the larger with respect to reservability, while it is preferably smaller with respect to moisture permeability and compatibility with cellulose ester.

Alcohols, which is utilized in polycarboxylic ester applicable in this invention, may be either one type or a mixture of at least two types.

An acid value of a polycarboxylic ester compound utilizable in this invention is preferably not more than 1 mg KOH/g and more preferably not more than 0.2 mg KOH/g. By setting the acid value within the above-described range, variation of retardation due to environment is preferably suppressed.

(Acid Value)

An acid value refers to a milligram value of potassium hydroxide required to neutralize acid contained in 1 g of a sample (carboxyl groups existing in a sample). An acid value is measured based on JIS K0070.

Specifically preferable examples of a polycarboxylic ester compound will be shown below, however, this invention is not limited thereto. For example, listed are triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate and tetrabutyl pyromellitate.

A polyester type plasticizer is not specifically limited, however, a polyester type plasticizer having an aromatic ring or a cycloalkyl ring in a molecule can be utilized. A polyester type plasticizer is not specifically limited, however, such as an aromatic terminal ester type plasticizer represented by following Formula (9) can be utilized.

  Formula (9)

(wherein, B" is a benzene monocarboxylic acid residual group; G" is an alkylene glycol residual grouop having a carbon number of 2 to 12, an aryl glycol residual group having a carbon number of 6 to 12, or an oxyalkylene glycol residual group having a carbon number of 4 to 12; A" is an alkylene dicarboxylic acid residual group having a carbon number of 4 to 12 or an aryl dicarboxylic acid residual group having a carbon number of 6 to 12; and n" is an integer of not less than 1.)

A compound represented by Formula (9) is comprised of benzene monocarboxylic acid residual group represented by B", an alkylene glycol residual group, an oxyalkylene glycol residual group or an arylglycol residual group represented by G", and an alkylen dicarboxylic acid residual group or an aryl dicarboxylic acid residual group represented by A"; and can be prepared by a reaction similar to that of a general polyester type plasticizer.

A benzene monocarboxylic acid component of polyester type plasticizer utilized in this invention includes such as benzoic acid, p-tertiary-butylbenzoic acid, ortho-toluic acid, metha-toluic acid, para-toluic acid, dimethylbenzoic acid, ethylbenzoic acid, n-propylbenzoic acid, aminobenzoic acid and acetoxybenzoic acid, and these each may be utilized alone or as a mixture of not less than two types.

An alkylene glycol component having a carbon number of 2-12, which can be utilized in this invention, includes such as ethylene glycol, 1,2-propylene glycol, 1,3-propylene glycol, 1,2-butanediol, 1,3-butanediol, 1,2-propanediol, 2-methyl-1, 3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-mthyl-1,8-octanediol, 1,9-nonanediol, 1,10-decanediol and 1,12-octadecanediol; and these glycols are utilized alone or as a mixture of at least two types. An alkylene glycol having a carbon number of 2-12 is specifically preferable because of excellent compatibility with cellulose ester.

Further, an oxyalkylene glycol component, having a carbon number of 4 to 12, of the above-described aromatic terminal ester includes such as diethylene glycol, triethylene glycol; tetraethylene glycol, dipropylene glycol and tripropylene glycol; and these glycols can be utilized alone or as a mixture of at least two types.

An alkylene dicarboxylic acid component, having a carbon number of 4 to 12, of aromatic terminal ester includes such as maleic acid, fumaric acid, glutaric acid, adipic acid, azereic acid, cebasic acid and dodecane dicarboxylic acid; and these may be utilized alone or as a mixture of not less than two types. An arylene dicarboylic acid component having a carbon number of 6 to 12 is phythalic acid, terephthalic acid, isophthalic acid, 1,5-naphthalene dicarboxylic acid and 1,4-naphthalene dicarboxylic acid.

A polyester type plasticizer utilized in this invention preferably has a number average molecular weight in a range of 300 to 1,500 and more preferably of 400 to 1,000. Further, an acid value thereof is not more than 0.5 mg KOH/g and a hydroxyl group value of not more than 25 mg KOH/g; and more preferably the acid value is not more than 0.3 mg KOH/g and the hydroxyl group value of not more than 15 mg KOH/g.

In the following, synthesis examples of an aromatic terminal ester type plasticizer utilizable in this invention will be shown.

<Sample No. 1 (Aromatic Terminal Ester Sample)>

Phthalic acid of 410 parts, 610 parts of benzoic acid, 737 parts of dipropylene glycol and 0.40 parts of tetraisopropyl titanate as a catalyst were charged together in a reaction vessel which was attached with a reflux condenser, and the system was kept heated at 130 to 250° C. to continuously remove the generated water while excess monohydric alcohol was refluxed with stirring in nitrogen gas flow. Next, the distillate was removed at 200 to 230° C. under a reduced pressure of not higher than $1.33 \times 10^4$ Pa and finally of not higher than $4 \times 10^2$ Pa, followed by being filtered to prepare an aromatic terminal ester type plasticizer having the following characteristics.

Viscosity (25° C., mPa·s); 43,400

Acid value; 0.2

<Sample No. 2 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 341 parts of ethylene glycol and 0.35 parts of tetraisopropyl titanate as a catalyst were utilized.

Viscosity (25° C., mPa·s); 31,000

Acid value; 0.1

<Sample No. 3 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,2-propanediol and 0.35 parts of tetraisopropyl titanate as a catalyst were utilized.
Viscosity (25° C., mPa·s); 38,000
Acid value; 0.05

<Sample No. 4 (Aromatic Terminal Ester Sample)>
An aromatic terminal ester type plasticizer having the following characteristics was prepared in an exactly similar manner to sample No. 1, except that phthalic acid of 410 parts, 610 parts of benzoic acid, 418 parts of 1,3-propanediol and 0.35 parts of tetraisopropyl titanate as a catalyst were utilized.
Viscosity (25° C., mPa·s); 37,000
Acid value; 0.05

In the following, specific examples of an aromatic terminal ester type plasticizer utilizable in this invention will be shown; however, this invention is not limited thereto.

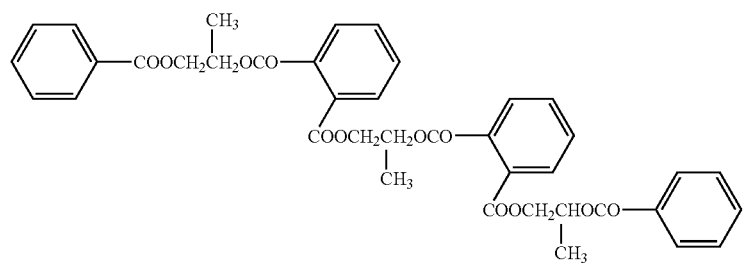

Mw: 696

(1)

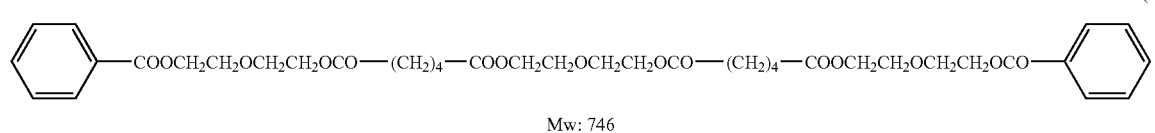

Mw: 746

(2)

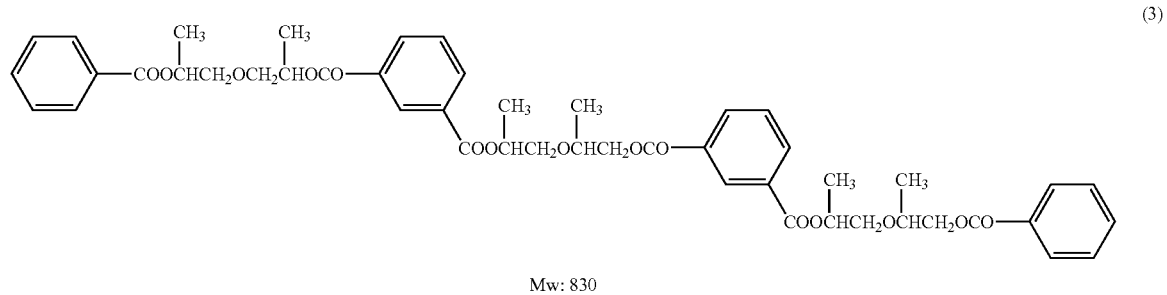

Mw: 830

(3)

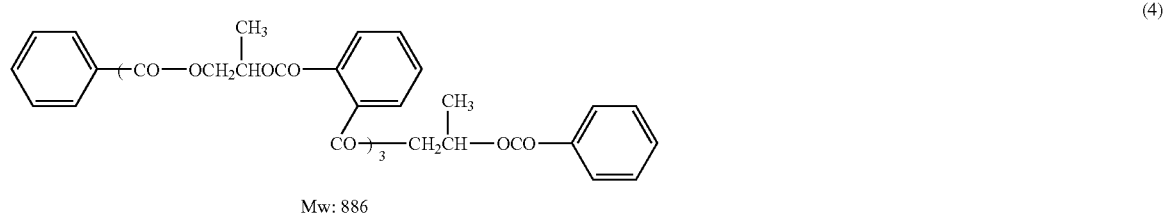

Mw: 886

(4)

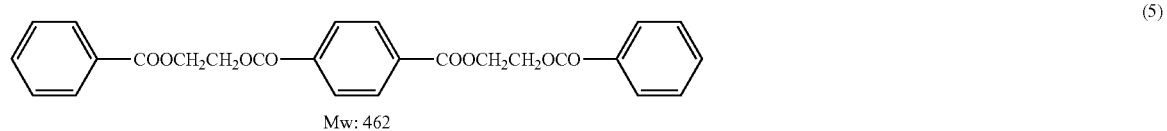

Mw: 462

(5)

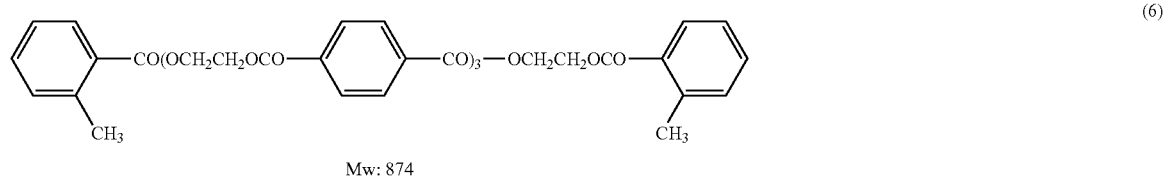

Mw: 874

(6)

-continued

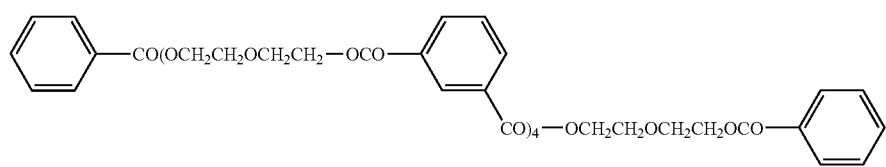
Mw: 1258 (7)

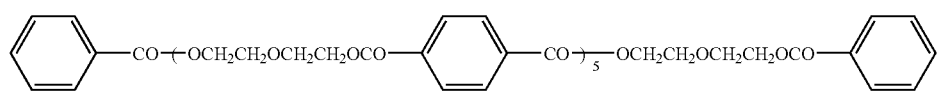
Mw: 1494 (8)

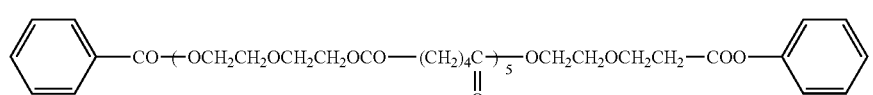
Mw: 1394 (9)

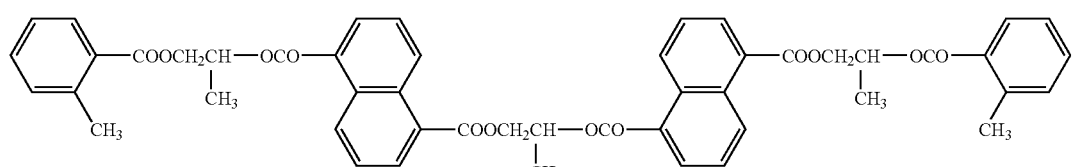
Mw: 852 (10)

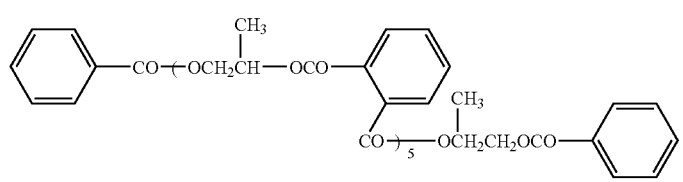
Mw: 1314 (11)

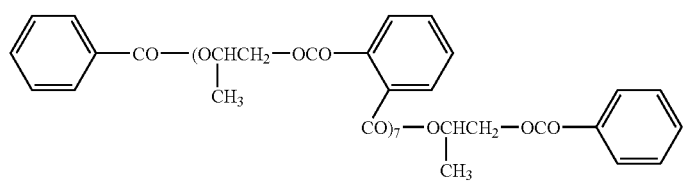
Mw: 1726 (12)

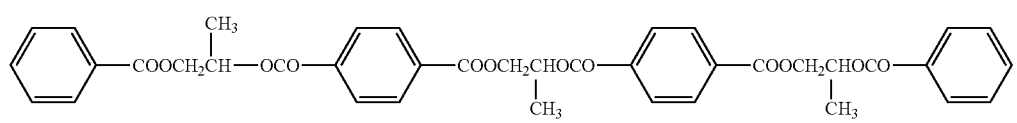
Mw: 696 (13)

(Ultraviolet Absorbent)

Cellulose ester film according to this invention can also incorporate an ultraviolet absorbent. An ultraviolet absorbent has an object to improve durability by absorbing ultraviolet rays of not longer than 400 nm, and in particular, transmittance at a wavelength of 370 nm is preferably not more than 10%, more preferably not more than 5% and still more preferably not more than 2%.

An ultraviolet absorbent utilized in this invention is not specifically limited, however, includes such as an oxybenzophenone type compound, a benzotriazole type compound, a salicylic ester type compound, a benzophenone type compound, a cyano acrylate type compound, a triazine type compound, a nickel complex type compound and inorganic powder.

For example listed are 5-chloro-2-(3,5-di-sec-butyl-2-hydroxylphenyl)-2H-benzotriazole, (2-2H-benzotriazole-2-yl)-6-(straight chain and branched dodecyl)-4-methylphenol, 2-hydroxy-4-benzyloxybenzophenone and 2,4-benzyloxybenzophenone; and also listed and preferably utilized are Tinuvins, such as Tinuvin 109, Tinuvin 171, Tinuvin 234, Tinuvin 326, Tinuvin 327 and Tinuvin 328, which are available on the market from Ciba Specialty Chemicals.

Ultraviolet absorbents utilized in this invention are preferably a benzotriazole type ultraviolet absorbent, a benzophenone type ultraviolet absorbent and a triazine type ultraviolet absorbent, and specifically preferably a benzotriazole type ultraviolet absorbent and a benzophenone type ultraviolet absorbent.

For example, as a benzotriazole type ultraviolet absorbent, a compound represented by following Formula (A) can be utilized.

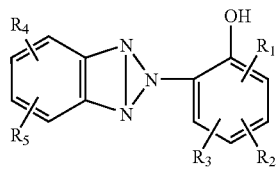

Formula (A)

In the formula, $R_1$, $R_2$, $R_3$, $R_4$ and $R_5$, which may be same or different, are a hydrogen atom, a halogen atom, a nitro group, a hydroxyl group, an alkyl group, an alkenyl group, an aryl group, an alkoxy group, an acyloxy group, an aryloxy group, an alkyltho group, an arylthio group, mono- or di-alkylamino group, an acylamino group or a 5-6 member heterocyclic group; and $R_4$ and $R_5$ may perform ring closure to form a 5-6 member carbon ring.

Further, these groups described above may be provided with a substituent.

In the following, specific examples of a benzotriazole type ultraviolet absorbent utilized in this invention will be listed; however, this invention is not limited thereto.

UV-1: 2-(2'-hydroxy-5'-methylphenyl)benzotriazole

UV-2: 2-(2'-hydroxy-3',5'-di-tert-butylphenyl)benzotriazole

UV-3: 2-(2'-hydroxy-3'-tert-butyl-5'-methylphenyl)benzotriazole

UV-4: 2-(2'-hydroxy-3',5'-di-tert-butylphenyl)-5-chlorobenzotriazole

UV-5: 2-(2'-hydroxy-3"-(3",4",5",6"-tetrahydrophthalimidomethyl)-5'-methylphenyl)benzotriazole UV-6: 2,2-methylenebis-(4-(1,1,3,3-tetramethylbutyl)-6-(2H-benzotriazole-2-yl)phenol)

UV-7: 2-(2'-hydroxy-3'-tert-butyl-5'-methylphenyl)-5-chlorobenzotriazole

UV-8: 2-(2H-benzotriazole-2-yl)-6-(straight chain and branched dodecyl)-4-methylphnol (Tinuvin 171)

UV-9: A mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (Tinuvin 109)

Further, a compound represented by following Formula (B) is preferably utilized as a benzophnone type ultraviolet absorbent.

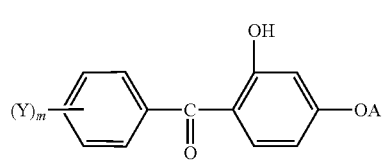

Formula (B)

In the formula, Y is a hydrogen atom, a halogen atom, an alkenyl group, an alkoxy group and a phenyl group; and these alkenyl group, alkenyl group and phenyl group may be provided with a substituent. A is a hydrogen atom, an alkyl group, an alkenyl group, a phenyl group, a cycloalkyl group, an alkylcarbonyl group, an alkylsulfonyl group or —CO(NH)$_{n-1}$-D group; and D is an alkyl group, an alkenyl group or a phenyl group which may be provided with a substituent. m and n are 1 or 2.

In the above description, an alkyl group is, for example, a straight chain or branched aliphatic group having a carbon number of up to 24; an alkoxy group is, for example, an alkoxy group having a carbon number of up to 18; and an alkenyl group is, for example, an alkenyl group having a carbon number of up to 16 such as an allyl group and a 2-butenyl group. Further, a substituent to an alkyl group, an alkenyl group and a phenyl group includes such as a halogen atom (such as a chlorine atom, a bromine atom and a fluorine atom), a hydroxyl group and a phenyl group (this phenyl group may be substituted by such as an alkyl group or a halogen atom).

In the following, specific examples of a benzophenone type ultraviolet absorbent represented by Formula (B), however, this invention is not limited thereto.

UV-10: 2,4-dihydroxybenzophenone

UV-11: 2,2'-dihydroxy-4-methoxybenzophenone

UV-12: 2-hydroxy-4-methoxy-5-sulfobenzophenone

UV-13: bis(2-methoxy-4-hydroxy-5-benzoylphenylmethane)

In addition to these, a disc form compound such as a compound having a 1,3,5-triazine ring is preferably utilized.

Cellulose ester film according to this invention preferably contains more than two types of ultraviolet absorbents.

Further, a polymer ultraviolet absorbent may also be preferably utilized as an ultraviolet absorbent, and polymer type ultraviolet absorbents described in JP-A 6-148430 are specifically preferably utilized.

As an addition method of an ultraviolet absorbent, an ultraviolet absorbent may be added into a dope after having been dissolved in an organic solvent such as alcohol like methanol, ethanol and butanol, methylenechloride, methyl acetate, acetone and dioxane; or may be directly added into a dope composition. Those insoluble in an organic solvent, such as inorganic powder, will be added into a dope after having been dispersed in an organic solvent and cellulose ester by use of such as a dissolver or a sand mill.

The using amount of an ultraviolet absorbent is not uniform depending on a type and a using condition of an ultraviolet absorbent, however, in the case of the dry layer thickness of cellulose ester film of 30 to 200 μm, it is preferably 0.5 to 4.0 weight % and more preferably 0.6 to 2.0 weight %, against the cellulose ester film.

<Dyes>

In order to optimize color of the cellulose ester film, dyes may preferably be added. For example, a blue dye may be added to reduce a yellow hue of the film. Preferable are anthraquinone type dyes.

The anthraquinone type dye may have any of several kinds of substituents in any of first to 8th positions of anthraquinone. Preferable substituents are an aniline group, a hydroxyl group, an amino group, a nitro group and a hydrogen atom. Blue dyes disclosed in JP-A 2001-154017, particularly anthraquinone type dyes, are preferably added to the film.

Additives described above may be added to a dope containing cellulose ester via batch mixing, or, alternatively, they may be added via in-line mixing using a dissolving solvent of the additives. Specifically, microparticles are preferably added, partially or entirely via an in-line mixing, in order to reduce a load to a filter.

In an in-line mixing process of additive solutions, a smaller amount of cellulose ester is preferably dissolved in the dope in order to obtain a sufficiently mixed dope. The amount of cellulose ester is preferably from 1 to 10 weight parts in 100 weight parts of solvent, and more preferably from 3 to 5 weight parts.

As a mixer for in-line addition and mixing, for example, a static mixer manufactured by Toray Engineering Co., Ltd. or a static type in-line mixer High-Mixer SWJ manufactured by Toray Industries, Inc., is preferably used.

<Manufacturing Method of Cellulose Ester>

Next, a manufacturing method of the cellulose ester of the present invention will be explained.

As the cellulose ester film of the present invention, either a film produced by a solution casting method or a film produced by a melt casting method may be preferably employed. Specifically, a cellulose ester film produced by a solution casting method or a melt casting method is preferably used.

The manufacturing method of the cellulose ester film in the present invention comprises a dope preparing step in which cellulose ester and additives are dissolved in solvents, a flow-casting step in which a dope is flow-cast on a continuously running endless metal support, a drying process in which a flow-cast dope is dried to form a web, a peeling step in which a dried web is peeled from a metal support, a stretching step in both the longitudinal and the lateral directions, a further drying step and a winding step of the resulting film.

In the dope preparing step, a higher content of cellulose ester in the dope is preferable since duration of the drying step following the flow-casting step is shortened, however, a too high content may result in loss of filtration accuracy. Preferable content of cellulose ester is from 10 to 35 percent by weight and more preferably from 15 to 25 percent.

A solvent may be used alone, however, two or more solvents may also be used together. A mixture of a good solvent and a poor solvent is more preferably used to increase manufacturing efficiency. A mixed solvent being rich in a good solvent is preferable to increase solubility of the cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester even. Sometimes, a solvent works as a good solvent of a cellulose ester, and sometimes as a poor solvent depending on the average acetification degree (degree of acetyl substitution) of the cellulose ester. For example, acetone is a good solvent for an acetic ester of a cellulose ester of which the acetification degree is 2.4, as well as for an acetatepropionate of a cellulose ester, however, it is a poor solvent for an acetic ester of a cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable. However, the present invention is not specifically limited thereto.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the step of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®) as well as metal(alloy) filters (such as stainless steel) are preferable, since these materials are free from peeling of a fiber, which may occur when fibrous material is used. Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials having a diameter of 0.01 mm or more is preferably 200 per $cm^2$ or less, more preferably 100 per $cm^2$ or less, still more preferably 50 per $cm^2$ or less and further more preferably from 0 to 10 per $cm^2$. The number of luminescent foreign materials having a diameter of 0.01 mm or less is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably 1.6 MPa or less, more preferably 1.2 MPa or less and still more preferably 1.0 MPa or less.

Flow-casting of a dope will be explained below:

A metal support polished to a mirror finished surface is used in the flow-casting step. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is preferably from 0 to 40° C. and more preferably from 5 to 30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, the air temperature should be higher than the desired temperature of the support.

In order to obtain a cellulose ester film with a sufficient flatness, the content of residual solvent in the web when it is peeled from a metal support is preferably from 10 to 150 percent by weight, more preferably from 20 to 40 or from 60 to 130 percent by weight, and specifically more preferably from 20 to 30 or from 70 to 120 percent by weight.

The residual solvent content of the web is defined by the following formula:

Residual solvent content (% by weight)=$\{(M-N)/N\}\times 100$

Where M represents weight of a sample of the web collected in the manufacturing step or after manufacturing, and N represents weight of the same sample after it was dried at 115° C. for 1 hour.

In the drying step of a cellulose ester film, the film is peeled from a support and further dried. The content of residual solvent in the resulting film is preferably 1 percent or less, more preferably 0.1 percent or less and specifically preferably from 0 to 0.01 percent.

In a drying process of a film, two methods may be employed, i.e., a roll drying method in which a cellulose ester film is passed through many rollers placed alternatively up and down in a staggered manner, and a tenter method in which a cellulose ester film is transported while both sides of the film are clipped to put tension in the lateral direction.

It is specifically preferable that a cellulose ester film is peeled from a metal support and is immediately stretched in the transport (longitudinal) direction while the film still contains much residual solvent. The film is then preferably stretched in the lateral (widthwise) direction using an above described tenter method. It is preferable to conduct this stretching process at a temperature of 110 to 160° C. The stretching magnifications in both the longitudinal and the lateral directions are preferably in the range from 1.05 to 1.3 and more preferably from 1.05 to 1.15. The area of the film is preferably from 1.12 to 1.44 times larger and more preferably from 1.15 to 1.32 times larger, after the film is stretched in both the longitudinal and the lateral directions. The magnification of the stretched film area is a product of the stretch magnifications in both the longitudinal and the lateral directions. When one of the two stretching magnifications is lower than 1.05, the flatness of the film may be reduced by the irradiation of the UV rays in the hard coat layer forming step. A stretching magnification of higher than 1.3 is also unfavorable because of a greater loss in flatness and an increase in haze of the film.

A film is preferably peeled from the support with a tension of 210 N/m or more and more preferably with a tension from 220 to 300 N/m in order to stretch the film in the longitudinal direction just after peeling.

The method to dry the web is not specifically limited, however, generally, hot air, IR ray, heated rollers or microwave irradiation is used. Hot air is preferably used with respect to ease of cure and low cost.

Drying temperature in a drying process of a web is preferably 40 to 200° C. and stepwise raised and more preferably in a range of 50 to 140° C. to improve dimension stability.

The layer thickness of cellulose ester film is not specifically limited; however, a layer thickness of 10 to 200 μm may be applied. The layer thickness is specifically preferably 30 to 100 μm, more preferably 40 to 80 μm, and furthermore preferably 50 to 70 μm.

Cellulose ester film of this invention has a width of 1 to 4 m. The width is preferably 1.4 to 4 m and specifically preferably 1.4 to 2 m, When the width exceeds 4 m, the transportation becomes difficult.

(Physical Properties)

Retardation values Ro, Rt of the cellulose ester film of the present invention can be obtained by the above formulas (1) and (II).

In the cellulose ester film of the present invention, the retardation value Ro defined by Formula (1) and measured under the condition of 23° C. and 55% RH is in a rage of 0 to 5 nm and the retardation value Rt defined by Formula (II) is in a range of −10 to 20 nm. Further, preferably Ro is in a range of 0 to 2 nm and Rt is in a range of −5 to 10 nm.

When the retardation value Ro is in a range of 0 to 5 nm and Rt is in a range of −10 to 20 nm, a polarizing plate curl is excellent and the surface nature of a film is good. Moreover, when a cellulose ester film is a light diffusing film, it excels in an optical diffusion effect.

In order to adjust retardation values within the above-mentioned ranges, it may be preferable to adjust suitably the kind and additive amount of the fine particles according to the present invention and resins having negative birefringence to a stretching direction so as to satisfy the constitution of the present invention.

The retardation values Ro, Rt can be measured by use of an automatic birefringence meter. For example, by use of KOBRA-21ADH (manufactured by Oji Keisokukiki Co., Ltd.), retardation values Ro, Rt can be measured under a condition of 23° C. and 55% RH at a wavelength of 590 nm.

Further, the slow axis of a film is desirably within ±1° in the widthwise direction or +1° in the lengthwise direction of a film.

Moisture permeability of cellulose ester film according to this invention is preferably 10 to 1,200 g/m²·24 h, more preferably 20 to 1,000 g/m²·24 h and specifically preferably 20 to 850 g/m²·24 h at 40° C., 90% RH. Moisture permeability can be measured according to a method described in JIS Z 0208.

Elongation percentage of the cellulose ester film according to this invention is preferably 10 to 80% and more preferably 20 to 50%.

Visible light transmittance of cellulose ester film according to this invention is preferably not less than 90% and more preferably not less than 93%.

The haze of cellulose ester film according to this invention in the case of a polarizing plate protective film is preferably less than 1% and specifically preferably 0 to 0.1%. In the case of a light diffusing film, it is preferably 1% or more and 90% or less, preferably 5% or more and 30% or less. The haze is measured by use of HazeMeter NDH2000 of Nippon Denshoku Industries Company in such a way that after a film was preserved on the condition of 23° C. and 55% RH for 24 hours, and the haze is measured with one sheet of the film by use of the haze meter in the same condition.

(Polarizing Plate)

A polarizing plate of this invention and a liquid crystal display device utilizing the same will be now explained.

A polarizing plate of this invention is characterized by being a polarizing plate constituted of a polarizer, pasted with the aforesaid cellulose ester film of this invention on at least one surface. A liquid crystal display device of this invention is characterized in that a cellulose ester film according to this invention is pasted up on at least one liquid crystal cell surface via an adhesive layer.

A polarizing plate of this invention can be prepared by an ordinary method. Cellulose ester film of this invention, the polarizer side of which is subjected to an alkaline saponification treatment, is preferably pasted up on at least one surface of a polarizer which has been prepared by immersion stretching in an iodine solution by use of a completely saponificated type polyvinyl alcohol aqueous solution. On the other surface, said cellulose ester film may be utilized or another polarizing plate protective film may be utilized. Cellulose ester film (such as Konicaminolta TAC KC8UX, KC4UX, KC5UX, KC8UCR3, KC8UCR4, KCBUY, KC4UY, KC12UR, KC4UE, KC8UCR-3, KC8UCR-4, KC8UCR-5, KC8UY-HA and KC8UX-RHA, manufactured by Konica-Minolta Opto. Inc.) available on the market is also preferably utilized. Against cellulose ester film of this invention, the polarizing plate protective film utilized on the opposite side of a polarizing plate via a liquid crystal cell is preferably provided with a phase difference of in-plane retardation Ro of 150 to 350 nm and Rt of −100 to 100 nm, which are measured at a wavelength of 590 nm. These can be prepared by a method described in such as JP-A 2005-196149 and JP-A 2005-275104. In addition to these, polarizing plate protective film having an optical anisotropic layer, which is formed by orientating an liquid crystal compound such as discotic liquid crystal, and functioning also as an optical compensation film can be also preferably utilized. For example, the optical anisotropic layer can be formed by a method described in JP-A 2005-275083. The above-described retardation film, by utilizing in combination with the cellulose ester film of this invention, can provide a liquid crystal display device having a stable effect of viewing angle enlargement.

A polarizer as a primary constitution element is an element to pass light of a polarized wave plane of a predetermined direction, and a typical polarizer known at present is polyvinyl type polarizing film, which includes polyvinyl alcohol film dyed with iodine and one dyed with dichroic dye. As a polarizer, utilized is one in which a polyvinyl alcohol aqueous solution is cast, and the cast film is uniaxially stretched and dyed, or is uniaxially stretched after having been dyed, preferably followed by being subjected to a durability treatment with a boron compound. The layer thickness of a polarizer is preferably 5 to 30 and specifically preferably 10 to 20 μl.

Further, ethylene modified polyvinyl alcohol which is described in such as JP-A 2003-248123 and JP-A 2003-342322 and has an ethylene unit content of 1 to 4 mol %, a polymerization degree of 2,000 to 4,000 and a saponification degree of 99.0-99.99 mol % is also preferably utilized. Among them, ethylene modified polyvinyl alcohol having a hot water breaking temperature of 66-73° C. is preferably utilized. Further, a difference of hot water breaking temperature between two points remote from each other by 1 cm in the film TD direction is preferably not more than 1° C. and more preferably not more than 0.5° C., with respect to decreasing color spottiness.

A polarizer utilizing this ethylene modified polyvinyl alcohol film is excellent in polarizing ability and durability, as well as exhibits few color spottiness, and is specifically preferably applied in a large size liquid crystal display device.

A polarizer prepared in the above manner, generally on the both surface or one surface of which protective film is pasted up, is utilized as a polarizing plate. An adhesive employed at the time of paste up includes a PVA type adhesive and an urethane type adhesive, however, among them preferably utilized is a PVA type adhesive.

(Liquid Crystal Display Device)

By the incorporation of the polarizing plate of the present invention into a display unit, it is possible to produce the display unit of the present invention excellent in various visibilities. The polarizing plate of the present invention are preferably used in a reflection type, transmission type, or half-transmission type LCD or a LCD of various drive types, such as a TN type, a STN type, an OCB type, a HAN type, a VA type, and an IPS type. Especially, when the polarizing plate of the present invention is incorporated into a commercially available IPS (In Plane Switching) mode type liquid crystal display, it can be possible to produce the liquid crystal display of the present invention excellent in visibility and having an expanded view angle.

In the present invention, IPS mode includes FFS (Fringe Field Switching) mode. The FFS (Fringe Field Switching) mode can be incorporated in the polarizing plate of the present invention as same as IPS mode and a liquid crystal device of the present invention having the same effect as the above effect can be produced.

In a liquid crystal display unit with a large screen of 30 type or more, a reflection image of a fluorescent lamp is observed with distortion due to color unevenness or waving unevenness. However, in the present invention, since there is no distortion like a reflection of a mirror, there is an effect that eyes do not get tired ever under long observation.

Moreover, a light diffusing film of the present invention can also be used by being pasted to a lightguide plate currently used for a sidelight type plane light source device used as a backlight of a transmission type liquid crystal display and a billboard.

FIG. 1 is a schematic diagram showing an example of the constitution of a liquid crystal display device of the present invention. In the liquid crystal display device, there is provided a liquid crystal cell 7, a polarizing plate A arranged at the viewing side of the liquid crystal cell 7 and a polarizing plate B arranged at the backlight side of the liquid crystal cell 7. The polarizing plate A has a polarizer 5a and polarizing plate protective films A1 and A2, and the polarizing plate B has a polarizer 5b and polarizing plate protective films B1 and B2.

In the above-mentioned constitution, the cellulose ester film according to the present invention can be used for any one of the polarizing plate protective films A1, A2, B1 and B2. Among them, it may be desirable that it is used as the polarizing plate protective film A1. Further, when the cellulose ester film according to the present invention is used as the polarizing plate protective film B1 near a backlight, since it can be used also as a light diffusing film, it is preferable.

EXAMPLE

Hereafter, the present invention is concretely explained with reference to Examples. However, the present invention is not limited to these.

Example 1

<<Preparation of Polymer>>
<Synthesis of Acrylic Polymer>
(Synthesis of AC1 to AC6: Polymer X)

Into a glass flask equipped with an agitator, 2 dropping funnels, a gas introducing tube and a thermometer, 40 g of a mixture of monomers of the types and ratios shown in Table 1, 3 g of mercapto propionic acid being a chain transfer agent and 30 g of toluene were charged, and the temperature was increased to 90° C. Subsequently, 60 g of a mixture of monomers of the types and ratios shown in Table 1 were added by dropping over a 3 hour period through one of the dropping funnels and at the same time, 0.6 g of azobisisobutylonitryl dissolved in 14 g of toluene was added by dropping over a 3 hour period through another one of the dropping funnels. Subsequently, 0.6 g of azobisisobutylonitryl dissolved in 56 g of toluene was further added by dropping over a 2 hour period and the reaction was continued for another 2 hours, whereby AC1 being polymer X was obtained. Next, the same synthesis as that for AC1 was conducted except that the additive amount of mercapto propionic acid being a chain transfer agent was changed, whereby acrylic polymers AC2 to AC4 having respective different molecular weights were obtained. Further, the same synthesis as that for AC1 was conducted except that 2-hydroxyethyl methacrylate (HEMA) was used in place of β-hydroxy ethyl acrylate (HEA), whereby acrylic polymers AC5 having respective different molecular weights were obtained. Further, the same synthesis as that for AC1 was conducted except that the ratio of monomers was changed, whereby AC6 was obtained.

(Synthesis of AC7: Polymer Y)

Bulk polymerization was performed by the polymerization methods described in Japanese Patent Application Laid-Open No. 2000-344823. That is to say, methylacrylate and ruthenocen were charged into a flask equipped with an agitator, a nitrogen gas introducing tube, a thermometer and a charging port, and the content was heated to 70° C. Subsequently, the half of the following β-mercaptopropionic acid which was fully substituted with nitrogen gas was added into the flask while stirring. After the addition of the β-mercaptopropionic acid, the temperature of the content being stirred in the flask was maintained at 70° C. and polymerization was performed for 2 hours. Further, after the remaining half of the β-mercaptopropionic acid which was fully substituted with nitrogen gas was added, the temperature of the content being stirred in the flask was maintained at 70° C. and polymerization was further performed for 4 hours. Thereafter, the temperature of the reactant was returned to room temperature, and then 20 parts by weight of a tetrahydrofuran solution with 5 mass % of benzoquinone was added and polymerization was stopped. While the polymer was heated gradually to 80° C. by an evaporator, the tetrahydrofuran, the remaining monomer and remaining thiol compound were removed, whereby AC7 being polymer Y was obtained.

| | |
|---|---|
| Methyl acrylate | 100 parts by weight |
| Ruthenocen (metal catalyst) | 0.05 parts by weight |
| β-mercaptopropionic acid | 12 parts by weight |

It is to be noted that MA, MMA, HEMA and HEA in Table 1 respectively are abbreviations for the following compounds.

MA: methyl acrylate
MMA: methyl metacrylate
HEMA: 2-hydroxyethyl metacrylate
HEA: β-hydroxy ethyl acrylate <Synthesis of Polyester>
(Synthesis of Polyester E1 to E7)

As polyester, compounds E1 to E7 according to Formulas (3) and (4) described in Table 1 were synthesized with the conventional method.

The weight average molecular weight of the above AC1 to AC7 and E1 to E7 were measured by the following method and indicated in Table 1.

(Measurement of Molecular Weight)

The measurement of the weight average molecular weight is done by use of high speed liquid chromatography.

The conditions for measurement are as follows.

Solvent: methylene chloride
Column: Shodex K806, K805, K803G (Three columns manufactured by Showa Denko K. K, are used consecutively.)
Column temperature: 25° C.
Sample concentration: 0.1 mass %
Detector: RI Model 504 (Manufactured by GL Science)
Pump: L6000 (Manufactured by Hitachi, Ltd.)
Flow rate: 1.0 ml/min
Calibration curve: Standard polystyrene STK standard polystyrene (Manufactured by Tohso) Correction calibration by 13 samples of Mw=1,000,000-500 is used. The 13 samples use substantially equal intervals.

It was confirmed by the examination for the birefringence of the polymer resin that the above-mentioned acrylic polymers AC1 to AC7 and polyesters E1 to E7 were resins having negative birefringence.

The details of each polymer prepared as described above are shown in the following Table 1.

TABLE 1

Polyester
$B_1$—(G—A—)$_m$G—$B_1$

| Name of composition | $B_1$ | G | A | Mw |
|---|---|---|---|---|
| E1 | $CH_3COO$ | $C_2H_4$—O | CO—$C_2H_4$—COO | 500 |
| E2 | $C_7H_{15}COO$ | $C_2H_4$—O | CO—$C_2H_4$—COO | 3000 |
| E3 | $CH_3COO$ | $C_2H_4$—O | CO—$C_2H_4$—COO | 8500 |
| | | $C_4H_8$—O | CO—$C_4H_8$—COO | |
| E4 | $C_{11}H_{23}COO$ | $C_2H_4$—O | CO—$C_2H_4$—COO | 30000 |
| | | $C_{12}H_{24}$—O | CO—$C_{10}H_{20}$—COO | |

$B_2$—(A—G—)$_n$A—$B_2$

| Name of composition | $B_2$ | A | G | Mw |
|---|---|---|---|---|
| E5 | $C_2H_5O$ | CO—$C_2H_4$—COO | $C_2H_4$—O | 1000 |
| E6 | $C_2H_5O$ | CO—COO | $C_4H_8$—O | 8000 |
| E7 | $C_2H_5O$ | CO—COO | $C_2H_4$—O | 25000 |

Acrylic polymer
(MMA)x-(HEA)y

| Name of composition | x | y | Mw |
|---|---|---|---|
| AC1 | 80 | 20 | 2000 |
| AC2 | 80 | 20 | 6000 |
| AC3 | 80 | 20 | 8000 |

TABLE 1-continued

| AC4 | 80 | 20 | 12000 |
|---|---|---|---|
| AC5 | MMA:HEMA = 80:20 | | 8000 |
| AC6 | 90 | 10 | 30000 |
| AC7 | MA | | 500 |

MA: metyl acrylate
MMA: methyl metacrylate
HEA: β-hydroxyethyl acrylate
HEMA: 2-hydroxyethyl metacrylate <<Preparation of Cellulose Ester Film>>
<Preparation of Cellulose Ester Film 1>
(Preparation of fine particle dispersion liquid 1)

| Aerosil 972 V (manufactured by Japan Aerosil) (average diameter of primary particles 16 nm, apparent density 90 g/liter) | 12 parts by weight |
|---|---|
| Ethanol | 88 parts by weight |

The substances listed above were agitated and mixed with a dissolver for 30 minutes and then dispersion was performed by use of Manton Gaulin. Into a silicon dioxide dispersing solution, 88 parts by weight of methylene chloride was added while stirring and the resultant was agitated and mixed for 30 minutes by use of a dissolver, whereby Fine particle dispersion diluent 1 was prepared.
(Preparation of In-Line Additive Liquid 1)

| TINUVIN 109 (Manufactured by Chiba Specialty Chemicals) | 11 parts by weight |
|---|---|
| TINUVIN 171 (Manufactured by Chiba Specialty Chemicals) | 5 parts by weight |
| Methylene chloride | 100 parts by weight |

The substances above were charged into a sealed container and heated while being stirred so as to be completely dissolved and then filtered.

Into the resultant liquid, 36 parts by weight of the fine particle dispersion diluent 1 was added while stirring, and after stirring for a further 30 minutes, 6 parts by weight of cellulose acetate propionate (acetyl group substitution degree of 1.9, propionyl group substitution degree of 0.8) was added while stirring, and after stirring for a further 60 minutes, the resultant was filtered with a polypropylene wind cartridge filter TCW-PPS-1N of Advantech Toyo Company, whereby Inline additive liquid 1 was prepared.
(Preparation of Dope Solution 1)

| Cellulose triacetate (indicated as TAC in Table) (acetylation degree: 61.5%, Mn = 110,000, Mw/Mn = 2.0) | 100 parts by weight |
|---|---|
| Plasticizer 1: Triphenyl phosphate (TPP) | 5 parts by weight |
| Plasticizer 2: Acetyl tributyl citrate (ATBC) | 5 parts by weight |
| Methylene chloride | 430 parts by weight |
| Ethanol | 40 parts by weight |

The substances above were charged into a sealed container and completed dissolved by being heated and stirred, and then filtered using Azumi filter paper No. 24 manufactured by Azumi Filter Paper Co., Ltd., whereby Dope solution 1 was prepared.

Dope solution 1 was filtered by use of Fine Met NF manufactured by Nippon Seisen Co., Ltd in a film manufacturing line. Inline additive liquid 1 was filtered by the Fine Met NF manufactured by Nippon Seisen Co., Ltd in the in-line additive liquid line. The filtered Inline additive liquid was added to the filtered Dope solution 1 so as to become parts by weight described in Table as silicon dioxide fine particles in a cellulose ester film, and then was sufficiently mixed in an inline mixer (Toray static in-tube mixer Hi-Mixer SWJ). Subsequently, by use of a belt casting device, the resultant solution was evenly cast on a 2-m width stainless steel band support at 35° C.

Thereafter, after the film was dried to a range to be able to peel, the film was peeled from the stainless steel band support. At this time, the amount of remaining solvent of the film was 80%. The time period required from the dope casting to the peeling was three minutes. After the film was peeled from the stainless bad support, the film was dried at 120° C. while being stretched in the width direction by a tenter. Thereafter, the film was released from the width retaining and then dried at 120° C. while being conveyed with many rollers. Further, the drying of the film was completed in a drying zone of 135° C. and a knurling process was applied to both edges of the film with a width of 10 mm and a height of 5 μm, whereby Cellulose ester film 1 with a thickness of 80 μm was produced. The film width was made 1.4 m and the wind-up length was made 3000 m. With regard to a wind-up tension, an initial tension was 150 N/1.4 m and a final wind-up tension was 100 N/1.4 m.
(Production of Cellulose Ester Films 2 to 35)

In the production of Cellulose ester film 1, the kind and additive amount of plasticizers 1 and 2, and the kind, average particle diameter and additive amount of fine particles, and film thickness were respectively changed as indicated in Table 2, whereby Cellulose ester films 2 to 35 were produced.

Here, as cellulose ester CAP in Table 2, cellulose acetate propionate (acetyl-group substitution degree: 2.0 and propionyl group substitution degree: 0.9, Mn: 80000, Mw/Mn=2.5) was used.

Further, as each of fine particles described in Table 2, the following commercially available fine particles were used. The dispersing condition described in the preparation of Fine particle dispersion liquid 1 was changed appropriately so that the average particle diameter of fine particles were adjusted as indicated in Table, and then fine particles were added.

R972V: manufactured by Japan Aerosil, average particle diameter of primary order particles 16 nm RX300: manufactured by Japan Aerosil, average particle diameter of primary order particles 7 nm R300: manufactured by Japan Aerosil, average particle diameter of primary order particles 7 nm 200V: manufactured by Japan Aerosil, average particle diameter of primary order particles 12 nm This average particle diameter of primary order particles can be measured by BET method (specific surface area measuring method) mentioned above. Further, the average particle diameter of fine particles described in Table 2 was measured from particles in a cross sectional image of a film cutting plane. Concretely, a film containing fine particles was embedded in a resin for embedding, and a 100-nm-thick ultrathin cut-out piece was made from the resin by use of ultramicrotome (MT-7 manufactured by RMC). This ultrathin cut-out piece was observed with the magnification of 10000 times by use of TEM (transmission type electron microscope: JEM-2000FX manufactured by Japanese Electronic Company, accelerating voltage: 200 kV), and its cross section image was photographed with a scanner. By use of an image analyzing software (WinROOF, ver3.60 manufactured Mitani Corp.), images of particles existing in a view field range of 2×2 μm were extracted from the photographed cross section image, the diameter of a particle image corresponding to a circle was+ calculated for each of the extracted images of particles, and an average diameter of 1000 particles corresponding to a circle is calculated, and the average diameter was made as a measured average particle diameter.

$$Ro = (nx-ny) \times d \quad \text{Equation (i)}$$

$$Rt = ((nx+ny)/2 - nz) \times d \quad \text{Equation (ii)}$$

(here, nx represents a refractive index in a film in-plane slow axis direction, ny represents a refractive index in a film in-plane fast axis direction, nz represents a refractive index in a film thickness direction, and d represents a film thickness.)

As a result, as indicated in Table 3, it turned out that the cellulose ester films 8 to 34 of the present invention into which resins having negative birefringence were added has Ro in a range of 0 to 5 nm and Rt in a range of −10 to 20 nm.

(Haze)

The haze of cellulose ester films was measured by use of HazeMeter NDH2000 of Nippon Denshoku Industries Company in such a way that after a film was preserved on the condition of 23° C. and 55% RH for 24 hours, and the haze was measured with one sheet of the film by use of the haze meter in the same condition.

<Evaluation 2: Evaluation of Polarizing Plate>

(Production of Polarizer)

A 120-μm polyvinyl alcohol film was immersed in 100 parts by weight of aqueous solution containing 1 parts by

TABLE 2

| *1 | Cellulose ester Kinds | *2 | Plasticizer 1 Kinds | *2 | Plasticizer 2 Kinds | *2 | Fine particles Kinds | *3 | *2 | Film thickness (μm) | Remarks |
|---|---|---|---|---|---|---|---|---|---|---|---|
| 1 | TAC | 100 | TPP | 5 | ATBC | 5 | R972V | 50 | 0.3 | 80 | Comp. |
| 2 | TAC | 100 | TPP | 5 | EPEG | 5 | R972V | 50 | 1 | 80 | Comp. |
| 3 | TAC | 100 | TPP | 5 | EPEG | 5 | R972V | 50 | 5 | 80 | Comp. |
| 4 | TAC | 100 | AC1 | 10 | AC4 | 3 | — | — | — | 80 | Comp. |
| 5 | TAC | 100 | AC1 | 10 | AC4 | 3 | R972V | 50 | 0.3 | 80 | Comp. |
| 6 | TAC | 100 | AC1 | 10 | AC4 | 3 | R972V | 450 | 5 | 80 | Comp. |
| 7 | TAC | 100 | AC1 | 25 | AC4 | 3 | R972V | 50 | 5 | 80 | Comp. |
| 8 | TAC | 100 | AC1 | 10 | AC4 | 3 | R972V | 50 | 1 | 80 | Inv. |
| 9 | TAC | 100 | AC1 | 7 | AC4 | 3 | R972V | 50 | 5 | 80 | Inv. |
| 10 | TAC | 100 | AC1 | 10 | AC4 | 3 | R972V | 50 | 3 | 80 | Inv. |
| 11 | TAC | 100 | AC1 | 10 | AC4 | 3 | R972V | 50 | 5 | 40 | Inv. |
| 12 | TAC | 100 | AC1 | 10 | AC4 | 3 | R972V | 50 | 7 | 80 | Inv. |
| 13 | CAP | 100 | AC3 | 10 | E1 | 3 | R972V | 50 | 5 | 80 | Inv. |
| 14 | TAC | 100 | AC3 | 10 | E2 | 3 | R972V | 50 | 5 | 40 | Inv. |
| 15 | TAC | 100 | AC3 | 15 | E3 | 3 | R972V | 50 | 5 | 80 | Inv. |
| 16 | TAC | 100 | AC3 | 20 | E4 | 3 | R972V | 50 | 5 | 80 | Inv. |
| 17 | TAC | 100 | AC3 | 10 | E5 | 3 | R972V | 50 | 5 | 80 | Inv. |
| 18 | TAC | 100 | AC3 | 15 | E5 | 3 | R972V | 50 | 5 | 80 | Inv. |
| 19 | TAC | 100 | AC3 | 10 | E6 | 5 | R972V | 50 | 5 | 80 | Inv. |
| 20 | TAC | 100 | AC3 | 15 | E7 | 5 | R972V | 50 | 5 | 80 | Inv. |
| 21 | TAC | 100 | AC1 | 10 | AC4 | 3 | R972V | 100 | 5 | 80 | Inv. |
| 22 | TAC | 100 | AC1 | 10 | AC4 | 3 | R972V | 350 | 5 | 80 | Inv. |
| 23 | TAC | 100 | AC1 | 10 | AC4 | 3 | R972V | 16 | 5 | 80 | Inv. |
| 24 | TAC | 100 | AC2 | 10 | E6 | 3 | RX300 | 50 | 5 | 80 | Inv. |
| 25 | TAC | 100 | AC4 | 10 | E6 | 3 | RX300 | 50 | 5 | 80 | Inv. |
| 26 | TAC | 100 | AC5 | 10 | E6 | 5 | RX300 | 50 | 5 | 80 | Inv. |
| 27 | TAC | 100 | AC6 | 15 | E6 | 5 | RX300 | 50 | 5 | 80 | Inv. |
| 28 | TAC | 100 | AC1 | 10 | ATBC | 3 | RX300 | 50 | 5 | 80 | Inv. |
| 29 | CAP | 100 | AC1 | 10 | E2 | 3 | R300 | 25 | 5 | 80 | Inv. |
| 30 | CAP | 100 | AC1 | 10 | E2 | 3 | R300 | 7 | 5 | 80 | Inv. |
| 31 | TAC | 100 | AC1 | 10 | E2 | 3 | 200V | 30 | 5 | 80 | Inv. |
| 32 | CAP | 100 | AC1 | 10 | TMPB | 3 | RX300 | 70 | 5 | 80 | Inv. |
| 33 | TAC | 100 | AC1 | 10 | E2 | 3 | RX300 | 70 | 15 | 80 | Inv. |
| 34 | TAC | 100 | AC1 | 10 | E2 | 3 | RX300 | 70 | 30 | 80 | Inv. |
| 35 | TAC | 100 | AC1 | 10 | E2 | 3 | RX300 | 70 | 55 | 80 | Comp. |

*1: Cellulose ester No.,
*2: Additive amount (parts by weight)
*3: Average particle diameter (nm)
TPP: Triphenyl phosphate
ATBC: Acetyl tributyl citrate
TMPB: trimethylolpropantribenzoate
EPEG: ethylphthalyl ethylglycolate <<Evaluation of Cellulose Ester Film and Polarizing Plate>>
<Evaluation 1: Evaluation of Cellulose Ester Film>

The following evaluation was conducted for the obtained cellulose ester films 1 to 35, the obtained results are shown in Table 3.

(Measurement of Retardation Ro and Rt)

Average refraction indexes of cellulose ester films were measured by an Abbe refractometer (4T) and film thicknesses were measured by a commercially available micrometer.

Film samples were kept in a test environment of 23° C. and 55% RH for 24 hours, their retardations were measured at a wavelength of 590 nm by an automatic double refractometer KOBRA-21ADH (manufactured by Oji Scientific Instruments) under the above environment, the obtained average refraction index and film thickness values were input to the following equations, and in-plane retardation (Ro) and retardation (Rt) along the thickness of the film sample were calculated.

weight of iodine and 4 parts by weight of boric acid, and then it was stretched 4 times at 50° C., whereby a polarizer was produced.

(Production of Polarizing Plates 1 to 35)

The above produced cellulose ester films 1 to 35 were subjected to alkali treatment with 2.5 mol/L of sodium hydroxide aqueous solution at 40° C. for 60 seconds, then washed with water for 3 minutes, and applied with saponification treatment, whereby alkali treated films were obtained.

Next, by use of the above produced polarizer and Konica Minolta TAC KC4UY (manufactured by Konica Minolta Opt. Inc.) being a commercial polarizing plate protective film, each of the cellulose ester films 1 to 35, the polarizer, and KC4UY were laminated in this order with a completeness saponification type 5% polyvinyl alcohol aqueous solution as an adhesive, whereby Polarizing plates 1 to 35 were produced.

(Evaluation of Polarizing Plate)

The following evaluation was performed by use of the obtained Polarizing plates 1 to 35, and the results are shown in Table 3.

(Measurement of Dimensional Stability)

Polarizing plates 1 to 35 were moisture-conditioned in a room of 23° C. and 55% RH for 24 hours, thereafter, in the same room, two cross marks were put with 100 mm interval in the longitudinal direction and the lateral direction on the surface of Polarizing plates 1 to 35, and the dimensions were measured very accurately and the distances were made as "a". Then, Polarizing plates 1 to 35 were treated at 80° C. and 90% RH for 50 hours, and thereafter moisture-conditioned again in the room of 23° C. and 55% RH for 24 hours. Thereafter, the distance between the two cross marks was measured by use of a cathetometer, and the measured value was made as "b". The dimensional stability was obtained from the following formula as a dimensional change rate.

Dimensional change rate (%) $[(b-a)/a] \times 100$ (Polarizing Plate Curl)

A polarizing plate cut in size of a length of 5 cm and a width of 1 cm was preserved the condition of 25° C. and 60% RH for 3 days, thereafter moved to another atmosphere of 25° C. and 10% RH, and 2 hours after that, curl was measured in accordance with the following formula.

Curl value=1/{radius of curvature of sample (cm)}

The curl value was evaluated, based on the following criteria.

A: less than 6

B: within the range of from not less than 6% to less than 15%

C: within the range of from not less than 15% to less than 60%

D: not less than 60

(Surface Nature of Polarizing Plate)

A turned-on fluorescent lamp pipe was projected on a surface of the polarizing plate, and foreign matters, distortion or fine turbulence on the surface were observed, and the surface nature was evaluated with ranks in accordance with the following levels.

A: No foreign matter was observed on the surface and the fluorescent lamp pipe was looked straight.

B: Foreign matters were slightly observed on the surface. However the fluorescent lamp pipe was looked straight.

C: Foreign matters were observed on the surface, and the fluorescent lamp pipe was looked curving.

D: Foreign matters were observed many on the surface, and the fluorescent lamp pipe was looked irregularly.

TABLE 3

| *1 | Rt (nm) | Ro (nm) | Haze (%) | Dimensional stability (%) | Polarizing plate curl | Polarizing plate surface nature | Remarks |
|---|---|---|---|---|---|---|---|
| 1 | 40 | 10 | 0.4 | −1.20 | D | D | Comp. |
| 2 | 35 | 8 | 0.5 | −1.10 | D | D | Comp. |
| 3 | 38 | 9 | 0.8 | −1.15 | D | D | Comp. |
| 4 | 13 | 6 | 0.3 | −0.90 | D | C | Comp. |
| 5 | 11 | 1 | 0.3 | −0.85 | D | C | Comp. |
| 6 | −5 | 2 | 5.0 | −0.85 | C | D | Comp. |
| 7 | −15 | 3 | 0.5 | −0.90 | D | C | Comp. |
| 8 | 8 | 2 | 0.5 | −0.60 | B | B | Inv. |
| 9 | 18 | 2 | 0.5 | −0.45 | A | A | Inv. |
| 10 | 7 | 2 | 0.5 | −0.40 | B | B | Inv. |
| 11 | 5 | 1 | 0.5 | −0.50 | A | A | Inv. |
| 12 | 3 | 3 | 0.5 | −0.30 | A | A | Inv. |
| 13 | 8 | 4 | 0.5 | −0.40 | A | A | Inv. |
| 14 | 5 | 1 | 0.5 | −0.55 | A | A | Inv. |
| 15 | 3 | 1 | 0.5 | −0.30 | A | A | Inv. |
| 16 | −6 | 1 | 0.5 | −0.25 | B | B | Inv. |
| 17 | 0 | 1 | 0.5 | −0.30 | A | A | Inv. |
| 18 | −2 | 3 | 0.5 | −0.30 | A | A | Inv. |
| 19 | 0 | 2 | 0.5 | −0.30 | A | A | Inv. |
| 20 | −3 | 2 | 0.5 | −0.25 | B | B | Inv. |
| 21 | −4 | 0 | 1.5 | −0.50 | A | B | Inv. |
| 22 | −7 | 1 | 4.0 | −0.55 | B | B | Inv. |
| 23 | −3 | 4 | 0.3 | −0.30 | A | A | Inv. |
| 24 | 1 | 1 | 0.5 | −0.30 | A | A | Inv. |
| 25 | −2 | 3 | 0.5 | −0.30 | A | A | Inv. |
| 26 | −4 | 2 | 0.5 | −0.30 | A | A | Inv. |
| 27 | −3 | 0 | 0.5 | −0.45 | B | B | Inv. |
| 28 | 4 | 3 | 0.5 | −0.55 | A | A | Inv. |
| 29 | 0 | 1 | 0.5 | −0.30 | A | A | Inv. |
| 30 | −1 | 1 | 0.3 | −0.35 | A | B | Inv. |
| 31 | 3 | 2 | 0.5 | −0.30 | A | A | Inv. |
| 32 | −1 | 3 | 0.5 | −0.30 | A | A | Inv. |
| 33 | −4 | 3 | 13 | −0.50 | B | B | Inv. |
| 34 | −5 | 2 | 30 | −0.55 | B | B | Inv. |
| 35 | 0 | 5 | 43 | −0.95 | D | D | Comp. |

*1: Cellulose ester film No.
Comp.: Comparative example, Inv.: Inventive example As being clear from the results indicated in Table 3, it turns out that cellulose ester films 8 to 32 of the present invention has a small haze and are excellent in dimensional stability at the time of being applied to a polarizing plate, polarizing plate curl, surface nature of a polarizing plate.

Further, it turns out that cellulose ester films 33 and 34 of the present invention are excellent in dimensional stability of a polarizing plate, polarizing plate curl, surface nature of a polarizing plate, in addition, since cellulose ester films 33 and 34 have a high haze, these films is suitable as a light diffusing film. On the other hand, cellulose ester films 1-7 being a polarizing plate protective film and cellulose ester film 35 being a light diffusing film are Comparative examples and inferior in dimensional stability of a polarizing plate, polarizing plate curl and surface nature of a polarizing plate, and do not exhibit the effect of the present invention.

Example 2

By use of polarizing plates 1 to 34 produced in Example 1, the following liquid crystal displays were produced.

<<Production of Liquid Crystal Display>>

Liquid crystal panels to conduct view angle measurement were produced in the following ways, and the characteristics as a liquid crystal display were evaluated.

Only the polarizing plate pasted previously at the viewing side (observer side) of Hitachi liquid crystal television Wooo W17-LC50 being an IPS mode type liquid crystal display was removed, and the above produced Polarizing plates 1 to 32 were pasted to the glass plane of the liquid crystal cell, respectively.

At that time, the pasting direction of the polarizing plates was such that the absorption axis of the polarizing plates was oriented to the same direction of that of the previously pasted polarizing plate and the above produced cellulose ester films 1-32 were arranged at the viewing side, whereby Liquid crystal displays 1-32 were produced.

Furthermore, in the constitution of the liquid crystal display 15 produced above, the polarizing plate pasted previously at the backlight side was removed and the polarizing plates 33 and 34 were pasted in place of it, whereby Liquid crystal displays 33 and 34 were produced. At that time, the polarizing plates 33 and 34 were pasted in such a way that cellulose ester films 33 and 34 being a light diffusing film were located at the backlight side.

<<Evaluation>>

Next, the following visibility evaluation was performed for Liquid crystal displays 1 to 34.

(Evaluation of Visibility)

A still image and moving image were displayed on the liquid crystal display panel (liquid crystal display), visual observation for them was carried out, and the visibility was evaluated with the following ranks.

A: Black was observed clear with tightness and no fluctuation of the moving image was acknowledged.

B: Black was observed clear with tightness, however, fluctuation of the moving image was slightly acknowledged.

C: Black was observed no tightness, clearness was slightly low and fluctuation of the moving image was acknowledged.

D: Black was observed no tightness, clearness was low and fluctuation of the moving image was noticeably acknowledged.

In the polarizing plate employing cellulose ester film of the present invention and the liquid crystal display devices 8 to 32, it turned out that the visibility was evaluated with the rank of A and B, fluctuation and un-sharpness were not observed and the liquid crystal display devices were an IPS mode type liquid crystal display device having high view angle stability. Further, in the liquid crystal display device 33 and 34, it turned out that luminance was high to the periphery of a screen and cellulose ester films 33 and 34 were an excellent light diffusing film.

Example 3

Liquid crystal devices were produced as same as those in Example 2 except that Hitachi liquid crystal television Wooo W32-L7000 being a FFS mode type liquid crystal display was used in place of Hitachi liquid crystal television Wooo W17-LC50 being an IPS mode type liquid crystal display used in Example 1, and the same evaluation as that in Example 2 was conducted. As a result, the same results as those in Example 2 were obtained and the liquid crystal display device according to the present invention had an excellent visibility.

The invention claimed is:

1. A cellulose ester film, containing:
fine particles having an average particle size of 1 nm or more and 400 nm or less in an amount of 1% by weight or more and 50% by weight or less in the cellulose ester film; and
a compound having a negative birefringence to a stretching direction;
wherein a retardation value Ro defined by the following Equation (I) is within a range of 0 nm or more and 5 nm or less, and a retardation value Rt defined by the following Equation (II) is within a range of −10 nm or more and 20 nm or less, provided that the retardation value Ro and the retardation value Rt are measured under the condition of 23° C. and 55%RH, $$Ro=(nx-ny)\times d \qquad \text{Equation (I)}$$

$$Rt=((nx+ny)/2-nz)\times d \qquad \text{Equation (II)}$$

in Equations (I) and (II), nx represents a refractive index in a film in-plane slow axis direction, ny represents a refractive index in a film in-plane fast axis direction, nz represents a refractive index in a film thickness direction, and d represents a film thickness (nm).

2. The cellulose ester film described in claim 1, wherein the fine particles are metal oxide fine particles.

3. The cellulose ester film described in claim 1, wherein the compound is one of an acrylic polymer having a weight average molecular weight of 500 or more and 30000 or less and a polyester having a weight average molecular weight of 500 or more and 10000 or less and not having an aromatic ring.

4. The cellulose ester film described in claim 3, wherein the acrylic polymer is one of polymer X represented by the following Formula (1) and polymer Y represented by the following Formula (2);

$$-(Xa)_m-(Xb)_n-(Xc)_p- \qquad \text{Formula (1)}$$

in Formula (1), Xa represents an ethylenic unsaturated monomer not having an aromatic ring and a hydroxyl group in a molecule thereof, Xb represents an ethylenic unsaturated monomer not having an aromatic ring and having a hydroxyl group in a molecule thereof, and Xc represents a copolymerizable ethylenic unsaturated monomer except Xa and Xb, and m, n, and p represent a mole composition ratio, provided that each of m, n and k is not 0, and (m+n+p)=100; and $$-[Ya]_k-[Yb]_q- \qquad \text{Formula (2)}$$

in Formula (2), Ya represents an ethylenic unsaturated monomer not having an aromatic ring in a molecule thereof and Yb represents an ethylenic unsaturated monomer copolymerizable with Ya, and k and q represent a mole composition ratio, provided that each of k and q is not 0, and (k+q)=100.

5. The cellulose ester film described in claim 3, wherein the polyester is represented by one of the following Formulas (3) and (4);

$$B_1-(G-A-)_mG-B_1 \qquad \text{Formula (3)}$$

in Formula (3), $B_1$ represents a mono-carboxylic acid having a carbon number of 1 to 12, G represents a divalent alcohol having a carbon number of 2 to 12, and A represents a dibasic acid having a carbon number of 2 to 12, and none of $B_1$, G and A contains an aromatic ring, and m is a repeating number; and $$B_2\text{-(A-G-)}_n\text{A-}B_2 \qquad \text{Formula (4)}$$

in Formula (4), $B_2$, represents a mono-alcohol having a carbon number of 1 to 12; G represents a divalent alcohol having a carbon number of 2 to 12; and A represents a dibasic acid having a carbon number of 2 to 12, and none of $B_2$, G and A contains an aromatic ring and n is a repeating number.

6. A light diffusing film, comprising:
the cellulose ester film described in claim 1.

7. A polarizing plate, comprising:
a polarizer; and
the cellulose ester film described in claim 1 and pasted on at least one surface of the polarizer.

8. A liquid crystal display device, comprising:
a liquid crystal cell; and
the light diffusing film described in claim 6 and pasted on at least one surface of the liquid crystal cell.

9. A liquid crystal display device, comprising:
a liquid crystal cell; and
the polarizing plate described in claim 7 and pasted on at least one surface of the liquid crystal cell.

10. The liquid crystal display device described in claim 9, wherein the liquid crystal cell is a liquid crystal cell for use in an IPS mode type liquid crystal display device.

* * * * *